United States Patent [19]

Alstad et al.

[11] Patent Number: 5,505,580
[45] Date of Patent: Apr. 9, 1996

[54] REFUSE HANDLING SYSTEM

[76] Inventors: John A. Alstad, P.O. Box 430, Sunburst, Mont. 59482; Navarre A. Massey, P.O. Box 1299, Fort MacLeod, Alberta, Canada

[21] Appl. No.: 232,833

[22] Filed: Apr. 22, 1994

[51] Int. Cl.[6] .................................................. B60P 1/06
[52] U.S. Cl. ................................. 414/499; 414/528
[58] Field of Search .................................. 414/498, 499, 414/500, 483, 528, 527; 180/14.4; 198/550.13

[56] References Cited

U.S. PATENT DOCUMENTS

| | | |
|---|---|---|
| 1,880,155 | 9/1932 | Ruth . |
| 2,099,684 | 11/1937 | Fitch . |
| 2,195,572 | 4/1940 | Konicek ........................... 414/483 |
| 2,408,862 | 10/1946 | Lisota ............................. 414/483 |
| 2,609,952 | 9/1952 | Balzer et al. . |
| 2,791,339 | 5/1957 | Sprague ........................... 414/528 |
| 2,869,660 | 1/1959 | Miller et al. ..................... 180/14.4 |
| 2,990,966 | 7/1961 | Schramm .......................... 414/483 |
| 3,014,729 | 12/1961 | Henningsen et al. ............... 414/528 |
| 3,071,264 | 1/1963 | Totaro et al. .................... 414/500 |
| 3,081,894 | 3/1963 | Osgood . |
| 3,247,983 | 4/1966 | Thompson . |
| 3,330,432 | 7/1967 | Blackburn et al. . |
| 3,366,257 | 1/1968 | Strom ............................. 414/483 |
| 3,720,328 | 3/1973 | Mackenzie ........................ 414/500 |
| 3,841,505 | 10/1974 | Kent .............................. 414/500 |
| 3,957,166 | 5/1976 | Durham . |
| 3,963,259 | 6/1976 | Massey . |
| 4,034,880 | 7/1977 | Frenette . |
| 4,047,630 | 9/1977 | Young . |
| 4,249,852 | 2/1981 | Alstad . |
| 4,308,516 | 12/1981 | Schmidt et al. ................... 414/528 |
| 4,441,848 | 4/1984 | Balley . |
| 4,704,062 | 11/1987 | Hale . |
| 5,108,250 | 4/1992 | Fewin, Jr. et al. ................ 414/528 |
| 5,203,668 | 4/1993 | Marmar ........................... 414/500 |

FOREIGN PATENT DOCUMENTS

| | | |
|---|---|---|
| 1024546 | 1/1978 | Canada . |
| 1029716 | 4/1978 | Canada . |

*Primary Examiner*—William E. Terrell
*Assistant Examiner*—Thomas J. Brahan
*Attorney, Agent, or Firm*—Wells, St. John, Roberts, Gregory & Matkin

[57] ABSTRACT

A refuse handling system having a towable multipurpose trailer and a refuse container which mates with the trailer. The refuse container is designed to receive and hold trash deposited at a remote waste collection site. The trailer has a receiving platform which tilts between a travel position and an inclined loading position. The trailer has a loading subassembly for loading and unloading the refuse container. A power unit is mounted on the trailer to drive the loading subassembly. Once loaded, the trailer transports the container to a central waste disposal site. The refuse container has a refuse discharger for emptying the container. A power transfer coupling is provided between the trailer and the container. This provides one power unit on the trailer hitch functions to both load the refuse container and discharge refuse from the container.

24 Claims, 17 Drawing Sheets

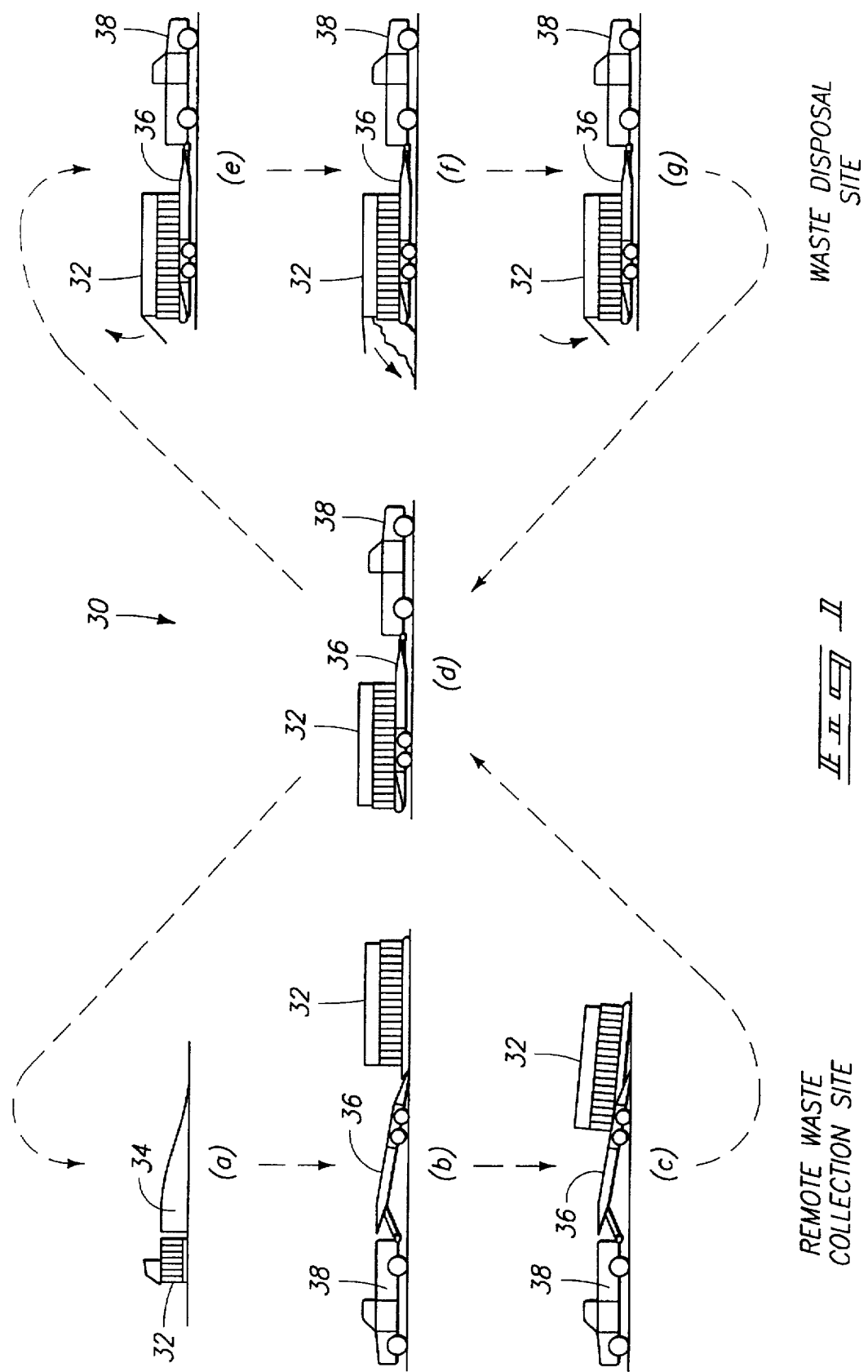

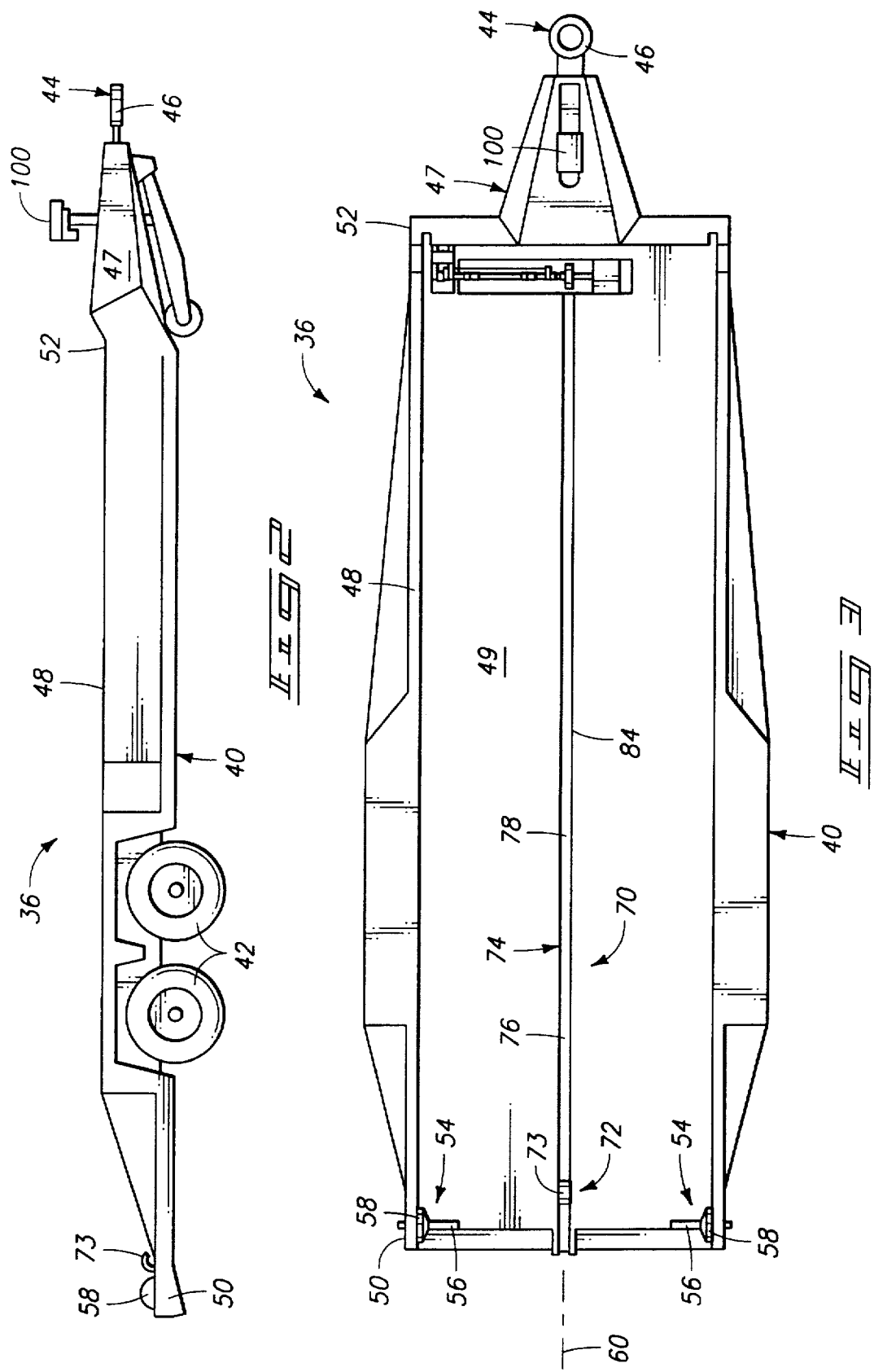

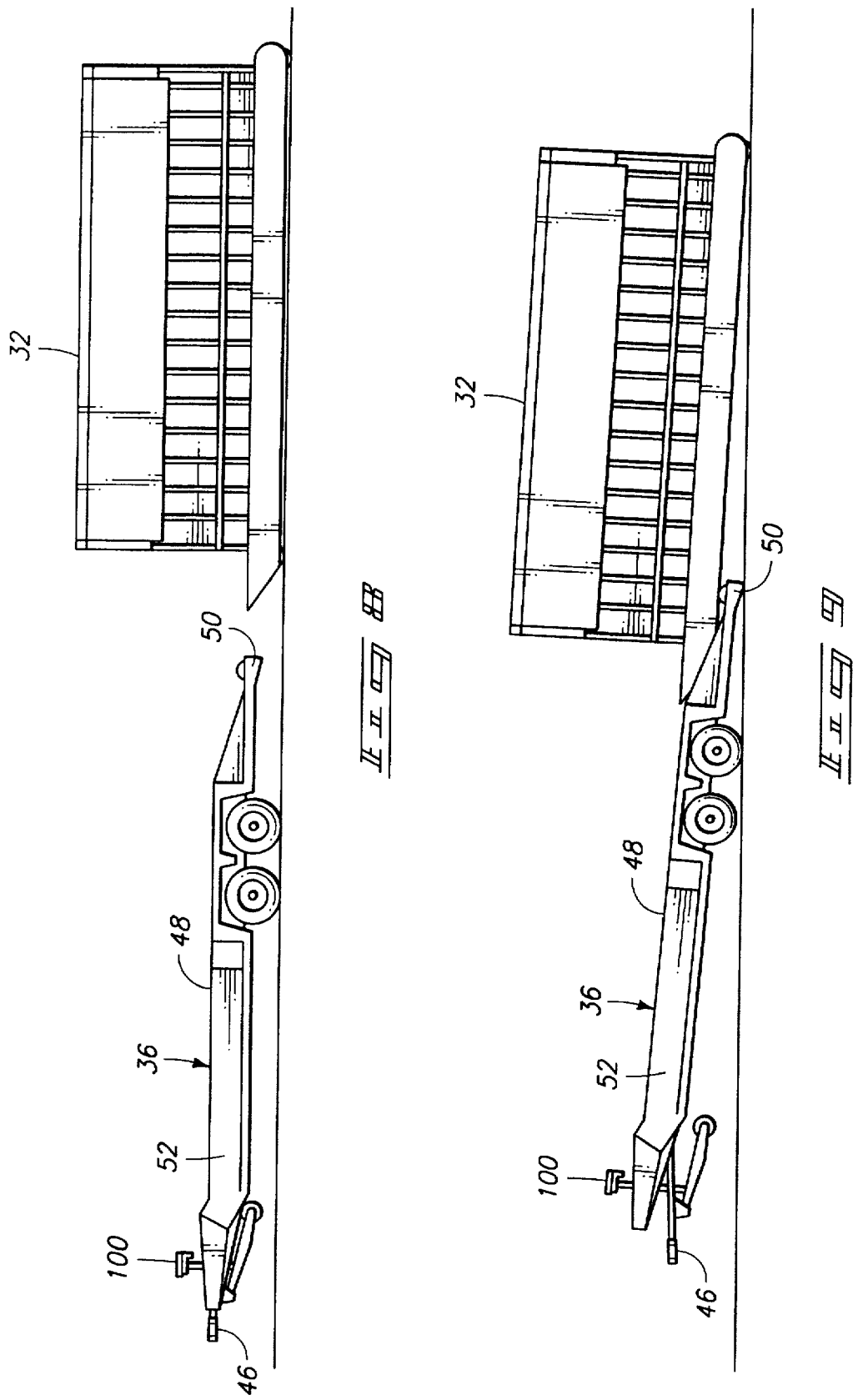

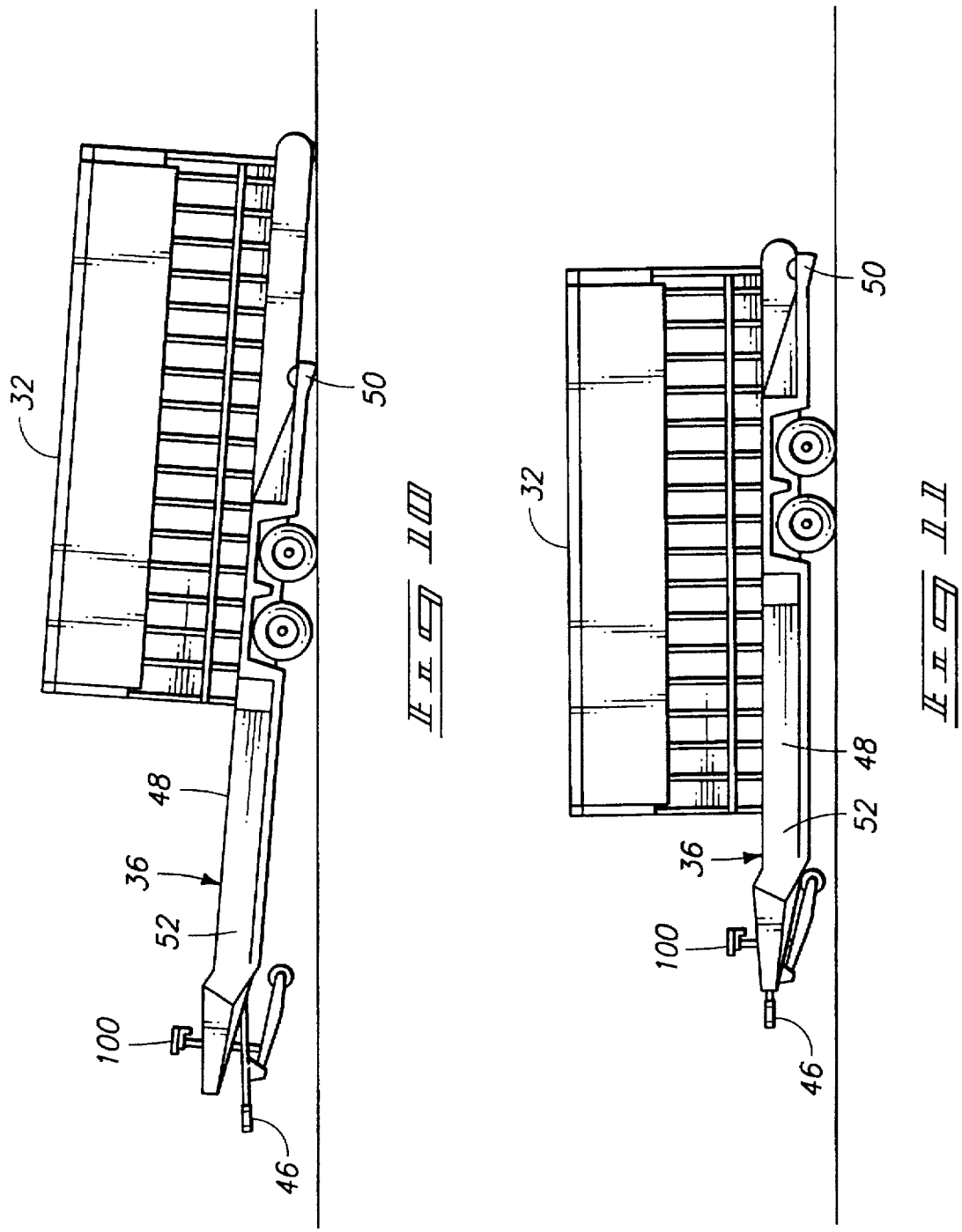

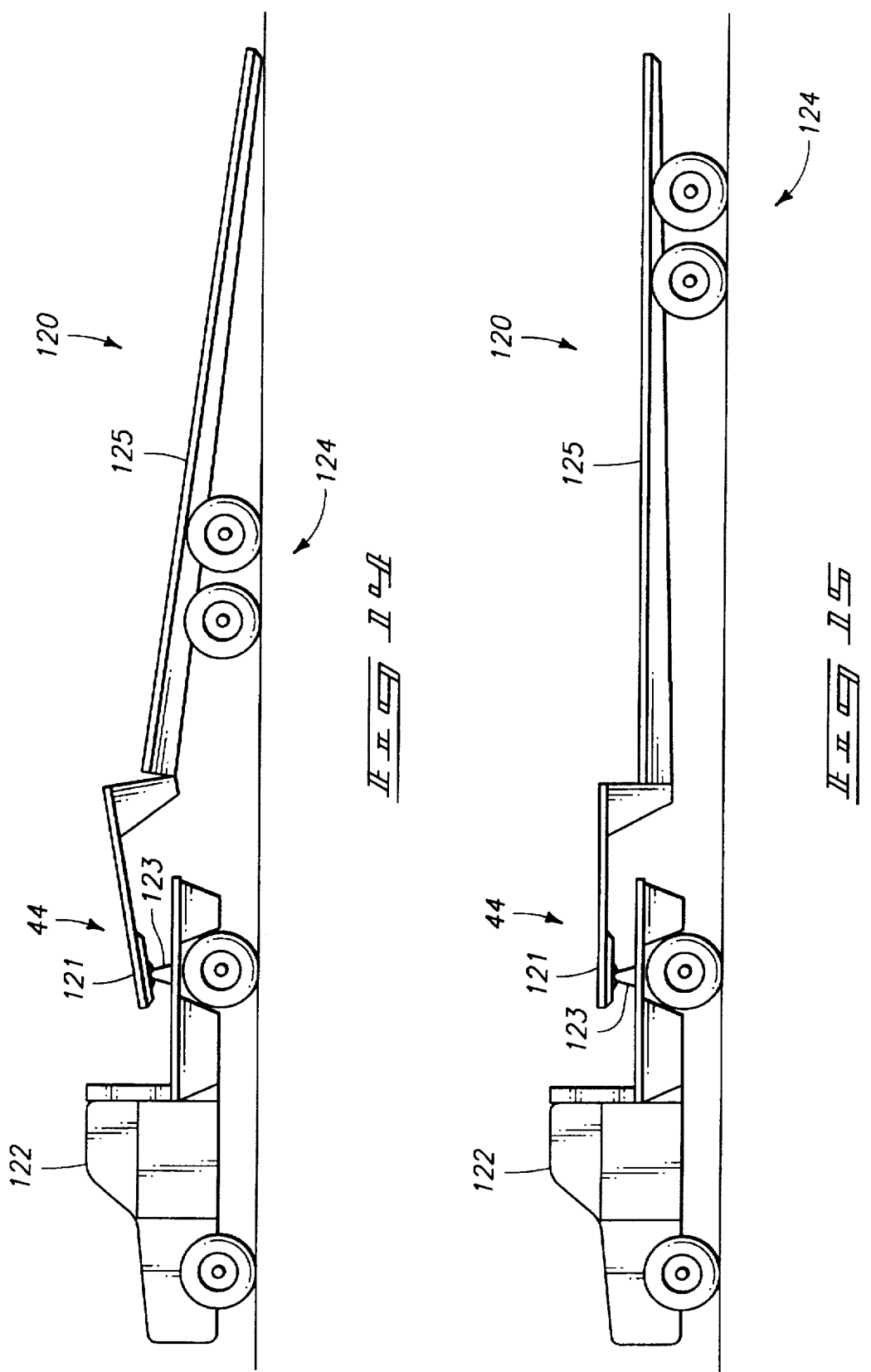

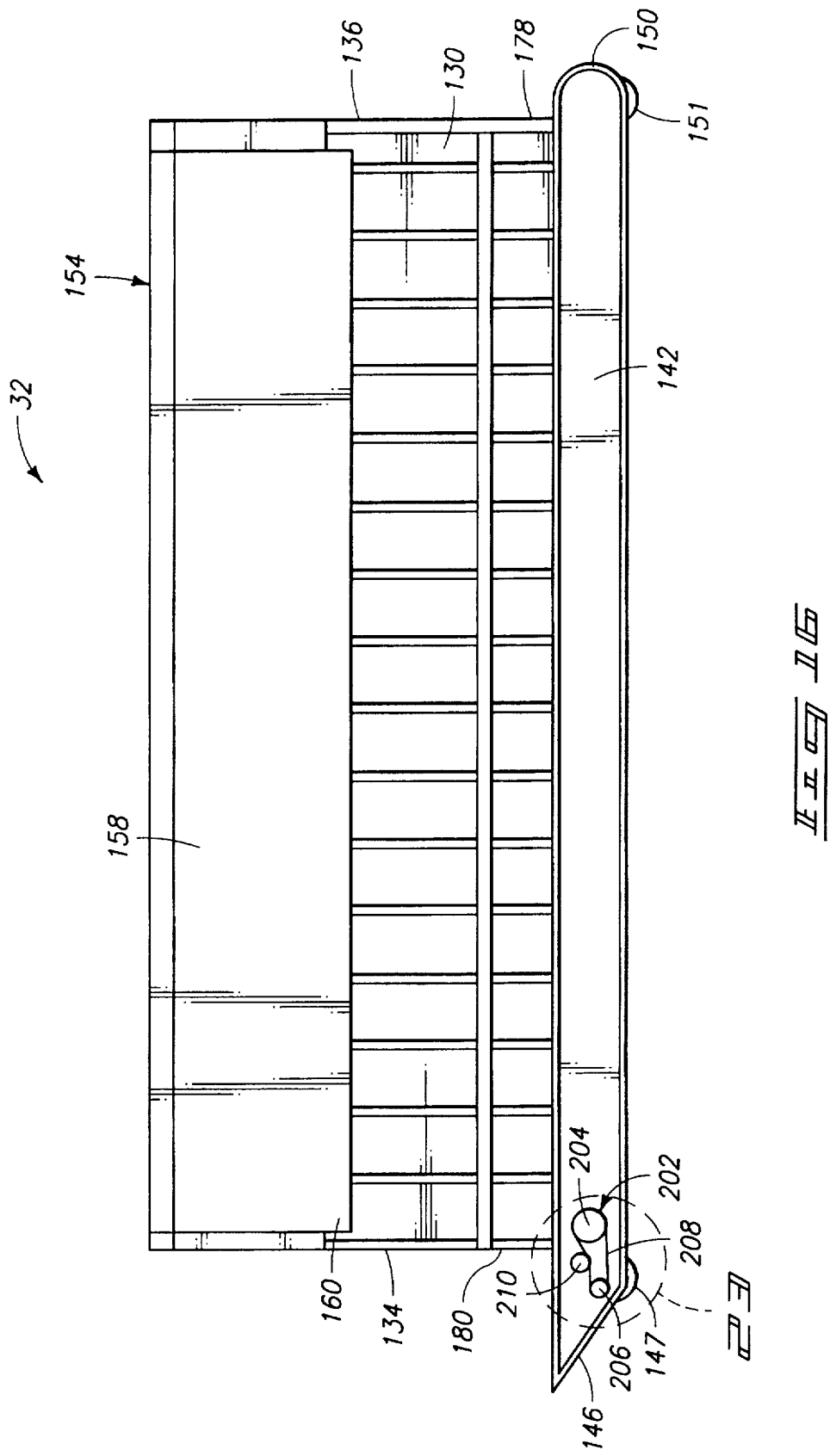

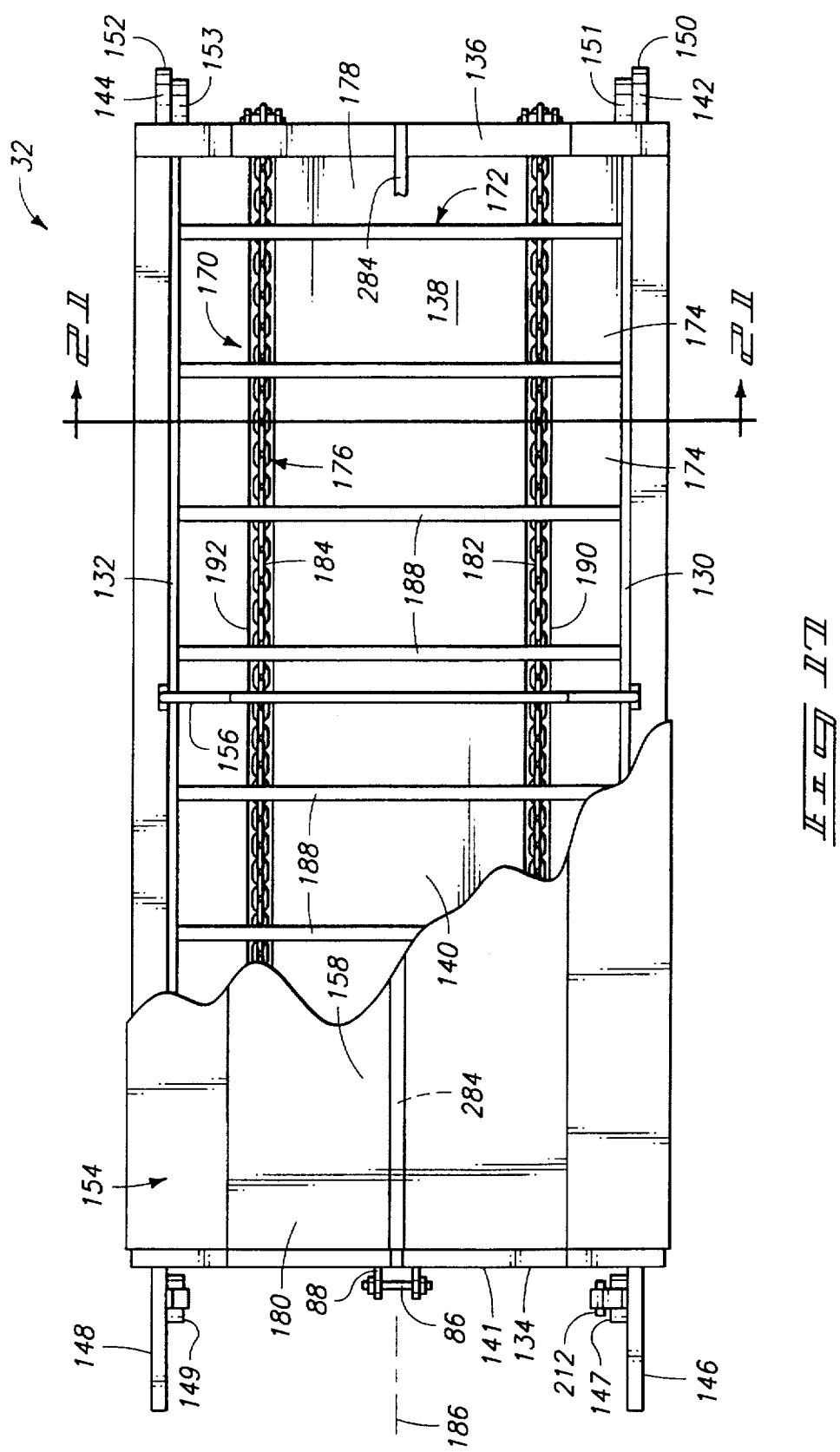

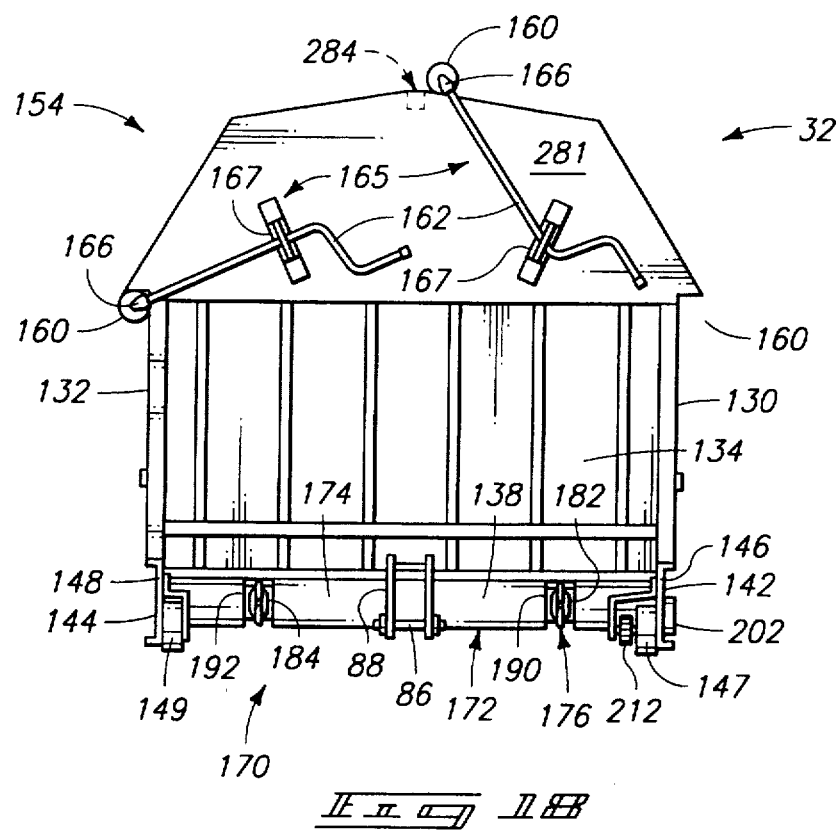
_Fig. 18_
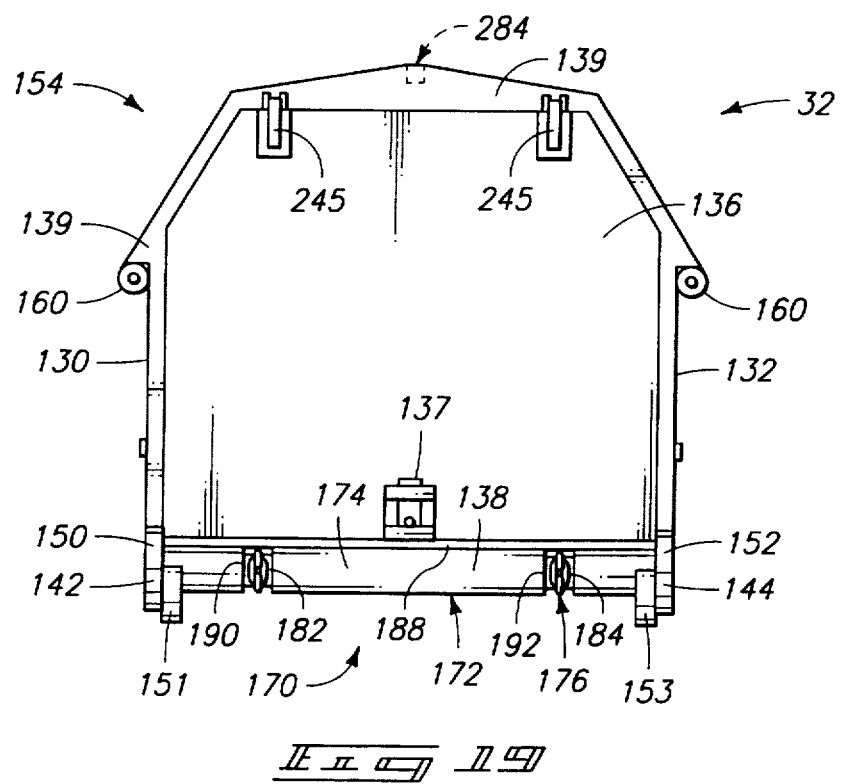
_Fig. 19_

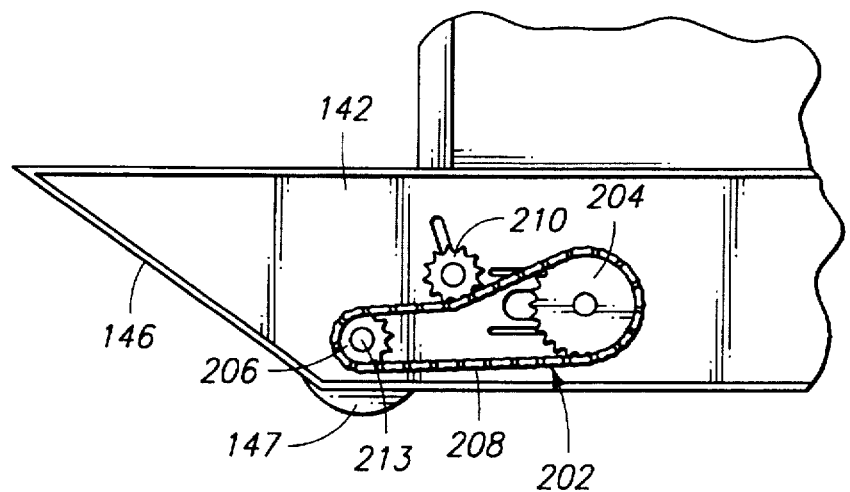
_Fig. 23_
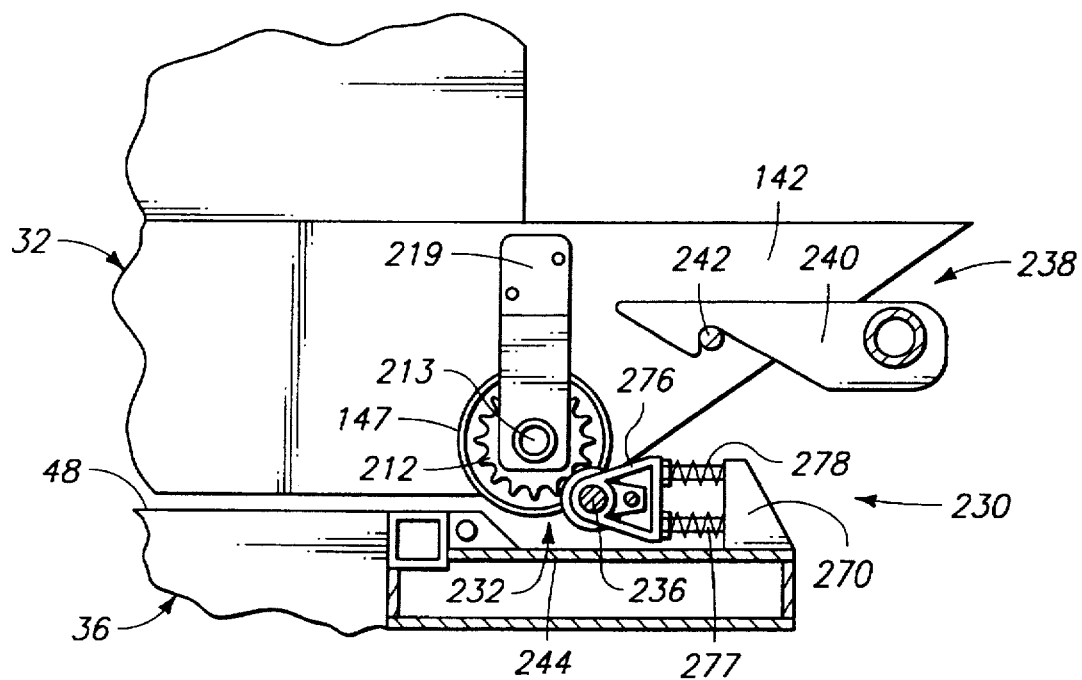
_Fig. 24_

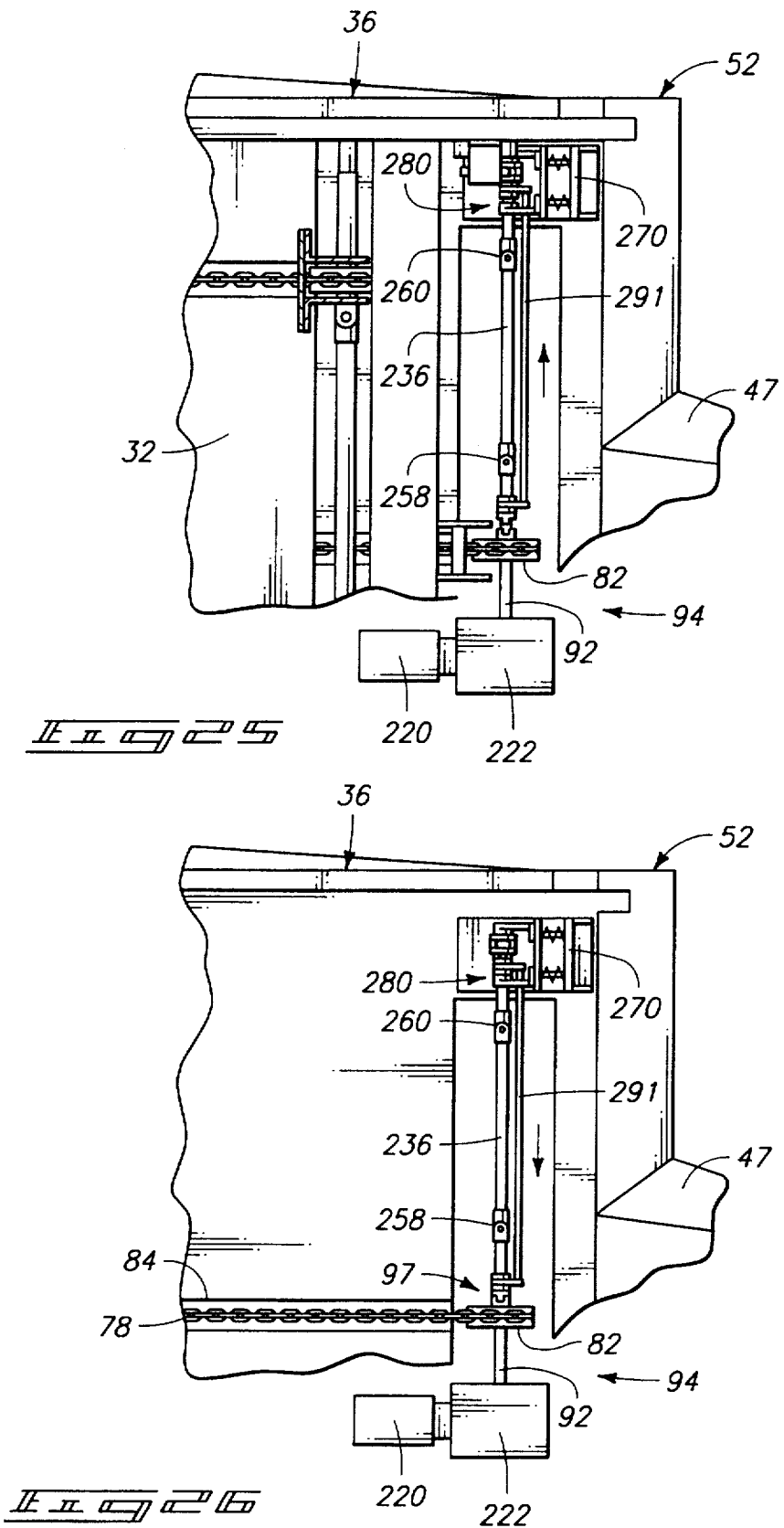

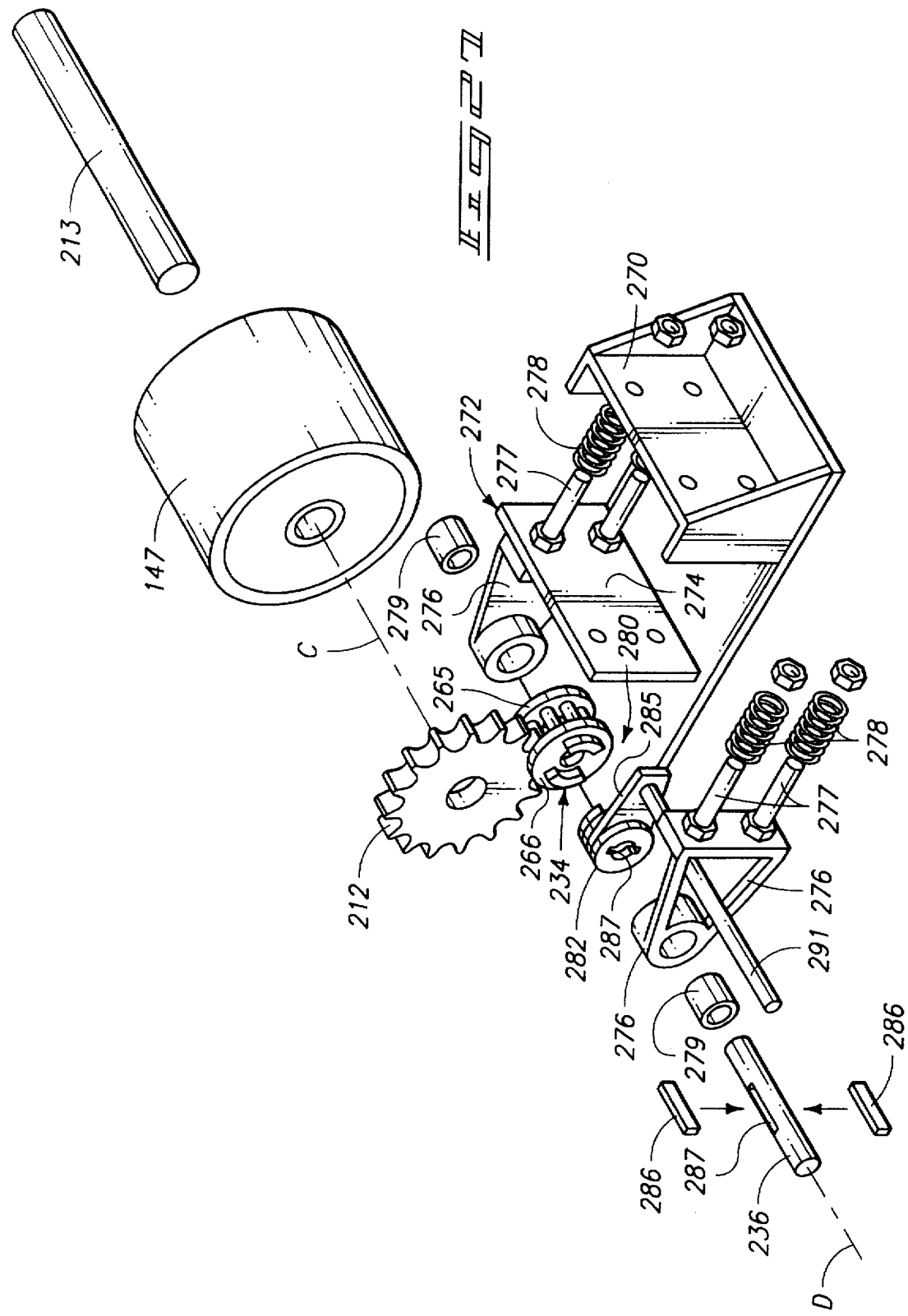

5,505,580

REFUSE HANDLING SYSTEM

TECHNICAL FIELD

This invention relates to systems for handling solid waste.

BACKGROUND OF THE INVENTION

Trash collection in rural regions is accomplished by locating multiple collection bins at various waste collection sites throughout the regions. The bins are typically large enough to hold a week's or month's amount of garbage deposited by the consumers nearest the collection site. The garbage is periodically retrieved from the various sites and taken to a central waste repository, such as a landfill or incinerator plant.

The garbage retrieval process can be accomplished in a variety of ways. One approach is to send a large garbage truck to each site to empty the individual bins at the remote regions. These trucks typically have a front or rear end loader which grasps each bin and dumps its contents into a large holding chamber on the truck. A second retrieval technique is to use mobile bins which are equipped with wheels and trailer hitches. The mobile bins are hitched to a semi-truck and towed to the central repository, where the bins are emptied. A third approach is to utilize portable bins which can be loaded onto a trailer or flatbed truck and transported by a vehicle to the dumping repository.

The above techniques are effective at handling waste, but are generally costly to implement. The mobil wheeled bins are expensive to manufacture in comparison to stationary or portable bins and thus, locating a mobil bin at each remote waste collection site can be expensive. The stationary bins require the purchase and operation of special garbage trucks that are capable of lifting and emptying the bins. The portable bins also often require a special hoist- or crane-mounted vehicle which raises the bins onto the flatbed. Accordingly, these techniques prove to be expensive alternatives.

Another problem concerns emptying the portable and mobile bins. It is common for the central repository to have special large dumping equipment designed to lift the bins and invert them to empty the trash contents. This dumping equipment is expensive and often requires skilled personnel to operate it.

The costs associated with these systems becomes nearly prohibitive for those consumer groups located in less populated rural areas because the few people cannot afford these elaborate systems.

This invention therefore provides a solid waste handling system which is a low cost alternative to these systems. The system of this invention includes a multipurpose trailer and refuse container which is easily loaded onto the trailer. The trailer and container are designed to be towed behind a small truck, such as a ¾-ton pick-up truck. The trailer is used to take the refuse container to and from central waste repositories. It is also multipurpose for use in other activities that are common in the rural environment, such as hauling farm equipment or other large machinery. The system also includes a unique design for discharging the trash at the central repository without having to remove the container from the trailer. The novel system thereby eliminates the expense of special garbage collection vehicles or large dumping equipment located at the central repository.

BRIEF DESCRIPTION OF THE DRAWINGS

One or more preferred forms of the invention are described herein with reference to the accompanying drawings. The drawings are briefly described below.

FIG. 1 is a diagrammatic illustration of a solid waste handling system according to this invention. The solid waste handling system comprises a trailer and a refuse container.

FIG. 2 is a side view of the trailer.

FIG. 3 is a top view of the trailer.

FIG. 8 illustrates an initial step in a process of loading the refuse container onto the trailer.

FIG. 9 is the loading process at a step subsequent to that shown in FIG. 8.

FIG. 10 is the loading process at a step subsequent to that shown in FIG. 9.

FIG. 11 is the loading process at a step subsequent to that shown in FIG. 10.

FIG. 14 is a side view of a trailer according to another embodiment having a fifth-wheel trailer hitch and an adjustable wheel shuttle assembly to tilt the trailer platform. FIG. 14 shows the wheel shuttle assembly in a forward position and the platform in an inclined position.

FIG. 15 similar to FIG. 14, but shows the wheel shuttle assembly in a rearward position and the platform in a travel position.

FIG. 16 is a side view of the refuse container.

FIG. 17 is a top view of the refuse container with the roof partially cut away to reveal the interior of the container.

FIG. 18 is a front end view of the refuse container.

FIG. 19 is a rear end view of the refuse container.

FIG. 23 is an enlarged partial view taken within circled area 23 of FIG. 16 and showing a front, outside end of a container side rail. FIG. 23 illustrates a looped chain coupling employed in the floor conveyor drive assembly of FIG. 22.

FIG. 24 is an enlarged partial view of the front, inside end of the FIG. 23 container side rail. FIG. 24 shows in elevation portions of a preferred power transfer subassembly.

FIG. 25 is a plan view showing front portions of the refuse container loaded onto the trailer. This Figure details the power transfer subassembly also shown in FIG. 24.

FIG. 26 is a plan view similar to FIG. 25 but showing only the trailer portions.

FIG. 27 is an exploded view of portions of the power transfer subassembly also shown in FIGS. 24–26.

DETAILED DESCRIPTION OF THE PREFERRED EMBODIMENTS

Figure 4:
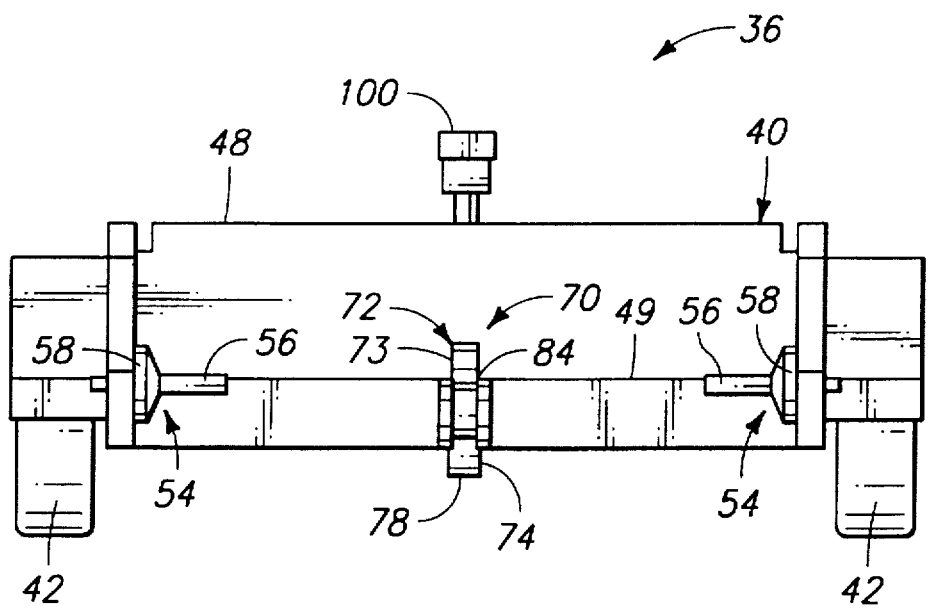
FIG. 4 is a rear end view of the trailer.
Figure 5:
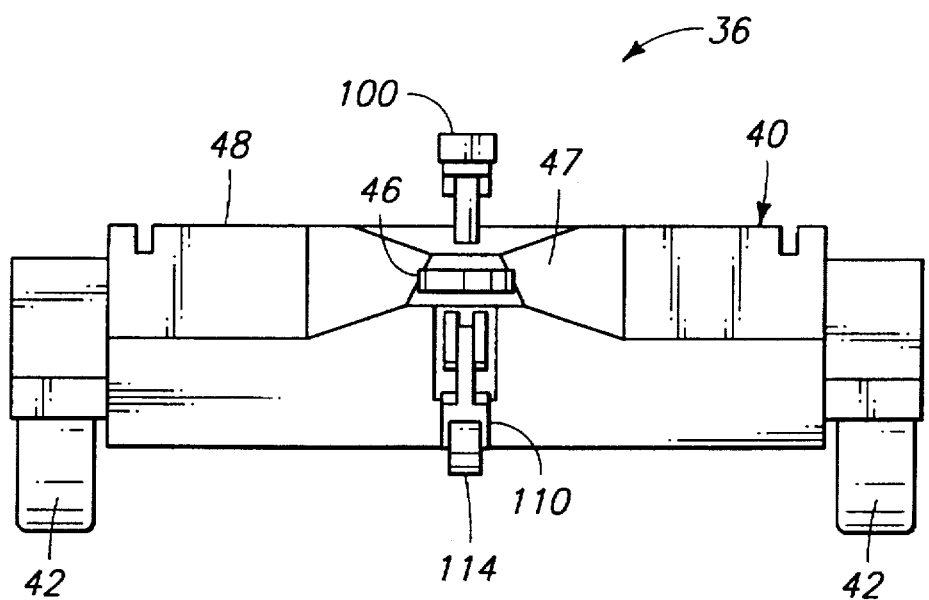
FIG. 5 is a front end view of the trailer.

This disclosure of the invention is submitted in furtherance of the constitutional purposes of the U.S. Patent Laws "to promote the progress of science and useful arts" (Article 1, Section 8).

SYSTEM

FIG. 1 diagrammatically illustrates a solid waste handling system 30 for collecting and disposing of garbage and other refuse. Solid waste handling system 30 includes a trash collection bin or refuse container 32 for receiving and holding solid waste and a multipurpose trailer 36 for loading and transporting refuse container 32.

Refuse container 32 is intended to be located at a remote waste collection site to accept trash from regional consumers and other users. Refuse container 32 has a retractable roof which allows the users to deposit trash into the container. Refuse can be directly thrown into container 32. Alternatively, an earthen ramp 34 (formed of dirt and gravel) or other drop off structure can be constructed adjacent to the refuse container 32 to facilitate depositing garbage into the container (FIG. 1a). When refuse container 32 is full, the roof is moved to cover the garbage and the refuse container is ready to be loaded onto the trailer.

Trailer 36 is constructed to be towed behind a truck 38, such as a ¾ or one-ton truck. Trailer 36 has a tiltable receiving platform which tilts to an inclined loading position to load refuse container 32. A loading subassembly attached to trailer 36 is utilized to move refuse container 32 onto the trailer and to secure the container in an installed position upon the receiving platform (FIGS. 1b and 1c). The refuse container is dimensioned to fit on the tilting platform of the trailer. A power unit is provided on trailer 36 to drive the loading assembly when loading refuse container 32 onto the trailer.

After the refuse container is loaded onto the trailer, truck 38 (or other tow vehicle) transports the trailer 36 and full container 32 from the remote waste collection site to a waste disposal site where the container is to be emptied (FIG. 1d). At the waste disposal site, a rear door on the refuse container is opened (FIG. 1e) and the contents of the container are expelled therefrom (FIG. 1f). Refuse container 32 preferably has a refuse discharger which discharges the trash through the open door. A detachable power transfer coupling is provided between the power unit on trailer 36 and the refuse discharger on container 32. The power transfer coupling transfers power from the power unit to drive the refuse discharger. In this manner, the same power unit serves the dual functions of powering the loading subassembly on the trailer to load the refuse container, and powering the refuse discharger on the container to discharge the trash. A mode selector is utilized to selectively direct power from the power unit to either the loading assembly or the refuse discharger.

After the container is emptied, the rear door is closed (FIG. 1g) and truck 38 transports trailer 36 and empty container 32 (FIG. 1d) from the waste disposal site back to the remote waste collection site (FIG. 1a). The refuse container is then unloaded from trailer 36 and positioned adjacent the earthen mound. The roof is once again retracted to allow users to dump trash into the refuse container (FIG. 1a).

The solid waste handling system 30 of this invention provides a low cost solution to the waste removal needs of rural and other sparsely populated areas. The multipurpose trailer can be used for many other tasks in addition to hauling the refuse container, such as transporting tractors or other farm equipment. Additionally, this invention provides a sophisticated refuse container with its own refuse discharger for conveniently dumping the refuse at the central waste disposal site without intervention from large dumping machinery. Because the refuse discharger is powered by the power unit on the trailer, the container can be constructed without its own separate power unit, thereby reducing the overall cost of manufacturing the container.

The following discussion focuses more particularly on the various components of the solid waste handling system 30 of FIG. 1.

Tilting Bed Trailer

FIGS. 2–5 show a preferred embodiment of multipurpose tilting bed trailer 36. The trailer includes a frame 40 and multiple wheels 42 (e.g., four wheels) rotatably connected to the frame. Trailer 36 has portions of a hitch 44 which is connected at the trailer tongue 47. Hitch 44 couples the trailer to a tow vehicle, such as truck 38. Hitch 44 is shown as an adjustable pintle hitch having a pintle latch on a reinforced tail bumper of the tow vehicle and a bolt-on pintle hook eye 46 on the trailer (see FIGS. 12 and 13). This hitch is preferred for smaller tow vehicles, such as a ¾-ton pickup truck. For larger tow vehicles (e.g., one-ton truck, minitractor, or diesel tractor) and larger refuse containers, a fifth-wheel trailer hitch can be substituted for the pintle hitch, such as shown in FIGS. 14 and 15.

FIGS. 2 and 3 show that trailer 36 comprises a tiltable receiving platform 48 which preferably forms part of frame 40. Platform 48 is designed to tilt between a travel position (e.g., FIGS. 8 and 11) and an inclined loading position (e.g., FIGS. 9 and 10). Platform 48 has a substantially flat, rectangular shaped bed 49 (FIG. 3). Bed 49 is elongated and extends longitudinally between a first, rear or loading end 50 and a second or front end 52. Platform 48 is sized of sufficient length and width to accommodate refuse container 32 (described below in more detail).

A pair of opposing lateral positioning rollers 54 are rotatably mounted to rear loading end 50 of receiving platform 48. The rollers provide a rollable edge engagement to facilitate loading of the refuse container onto platform 48. Lateral positioning rollers 54 have cylindrical sections 56 inwardly adjacent to centering conical sections 58. The centering cones guide the refuse container during loading to approximately align a central longitudinal axis of the container with a longitudinal center axis 60 of the platform (FIG. 3).

Loading Subassembly

Trailer 36 is equipped with a loading subassembly 70 for loading the refuse container onto receiving platform 48. As shown, loading subassembly 70 has a trailer latch part 72 which detachably engages the refuse container, such as at a nose section of the refuse container. Latch 72 is preferably embodied as a detachable hook 73. Loading subassembly 70 also includes a container loading or hoisting drive 74 which positions and propels latch part 72. Latch 72 is movable between a rear engagement position near the rear loading end 50 of platform 48 where the latch engages the container, and a front or installed position near front end 52. Movement of latch 72 pulls the container onto the platform and into an installed container position.

Figure 6:
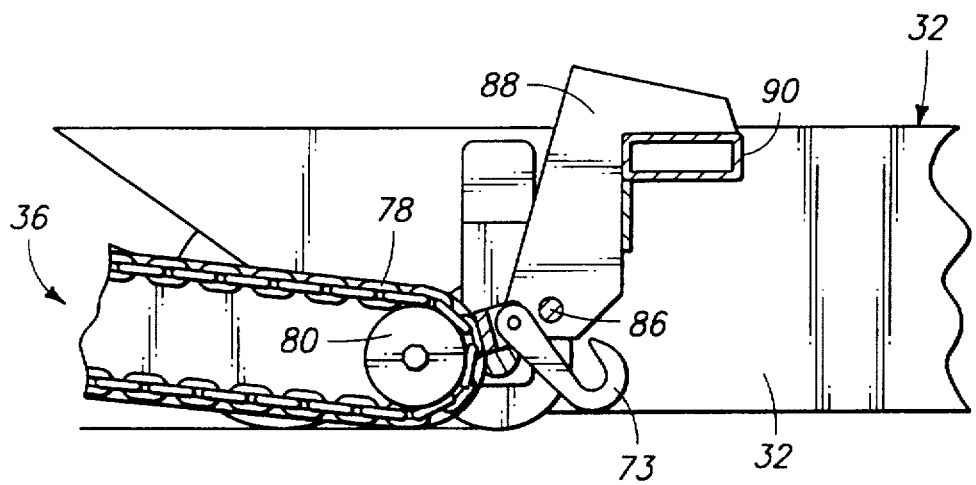
FIG. 6 shows a preferred embodiment of a loading assembly for loading the refuse container onto the trailer.
Figure 7:
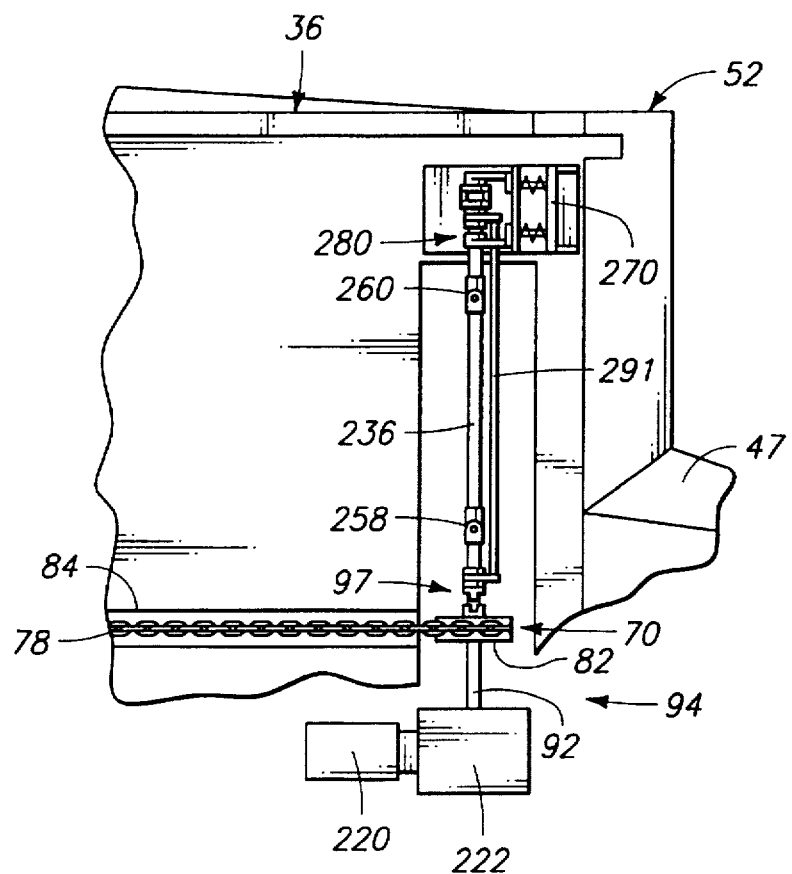
FIG. 7 shows a power unit and power transfer assembly according to one embodiment of this invention.

The container loading subsystem includes a loading drive 74 which is preferably formed as an endless or circuitous chain loading conveyor 76. Conveyor 76 advantageously extends along the longitudinal axis 60 from rear end 50 to front end 52 of the trailer platform. Chain conveyor 76 comprises an endless chain 78 which travels in a closed loop supported and trained between two chain sprockets 80 and 82 (FIGS. 6 and 7). Sprockets 80 and 82 are provided at opposing ends 50 and 52 of the platform. Chain conveyor 76 may also include additional guide members or other supports for the endless chain, such as the loading chain receptacle channel 84.

Platform bed 49 preferably includes channel 84 formed therein, such as along axis 60. Channel 84 receives and guides the upper leg of container loading chain 78. Channel 84 has a depth that allows the chain to ride beneath the flat surface plane of platform bed 49. The return travel leg of endless chain 78 is underneath platform bed 49. The channel construction permits the trailer to be used for many other purposes besides waste removal tasks, such as hauling equipment, because the equipment can be loaded onto the flat bed trailer without interfering with or damaging the chain conveyor.

FIG. 6 shows one end of chain conveyor 76 having the container movement chain 78 wrapped around rear chain sprocket 80. Latching hook 73 is bolted to chain 78 and oriented thereon to fasten to a latch pin 86 that is structurally mounted on refuse container 32 (FIG. 6). Latch pin 86 is advantageously a transverse bar fixed to an L-shaped projecting catch member 88. Catch member 88 is connected to the center of a cross beam 90 on the front or nose section of the refuse container. A grab chain (not shown) may be provided to help ensure connection between hook 73 and container latch pin 86, particularly when loading on uneven terrain.

FIG. 7 shows the front end of chain loading conveyor 76. Chain 78 is wound around the front loading chain sprocket 82. A loading conveyor drive shaft 92 interconnects chain sprocket 82 to a power unit 94. Power unit 94 generates the power to rotate the endless chain conveyor, and is described below in more detail.

FIGS. 8–11 demonstrate sequential operating steps of loading refuse container 32 onto trailer 36. First, trailer 36 is aligned with container 32 (FIG. 8). Receiving platform 48 is then tilted to an inclined loading position (FIG. 9) wherein the rear or loading end 50 is near or actually touches the ground. Loading subassembly 70 is activated to rotate endless chain conveyor 76 until hook 73 is moved adjacent to, and is clasped onto, catch pin 86 of refuse container 32. Once hooked, the chain conveyor is operated to move hook 73 from the rear loading end 50 toward the front end 52 to thereby pull refuse container 32 onto platform bed 49 (FIGS. 9–11). The refuse container initially engages and moves over lateral positioning rollers 54. As the container continues to move onto the trailer, centering conical sections 58 guide the container toward center axis 60. In this manner, the loading subassembly 70 and lateral positioning rollers 54 form a precision loading unit which positions the refuse container onto the platform during loading.

The loading conveyor is rotated until refuse container 32 reaches its installed position on platform 48. At that point, the refuse container is preferably further secured to the trailer. An exemplary container lock or securing mechanism 238 is shown in FIG. 24 and will be further described below. After the container is installed, the platform is then tilted back to its travel position (FIG. 11) and is ready for transporting the refuse container.

Powered Platform Tilting and Hitching Assembly

Multipurpose trailer 36 advantageously has a powered platform tilting assembly used to tilt the platform between its inclined and travel positions. In one embodiment, the platform tilting assembly comprises a power jack 100 mounted on the tongue of trailer 36. Power jack 100 forcibly raises the front end 52 of platform 48 and thereby lowers rear end 50.

Figure 12:
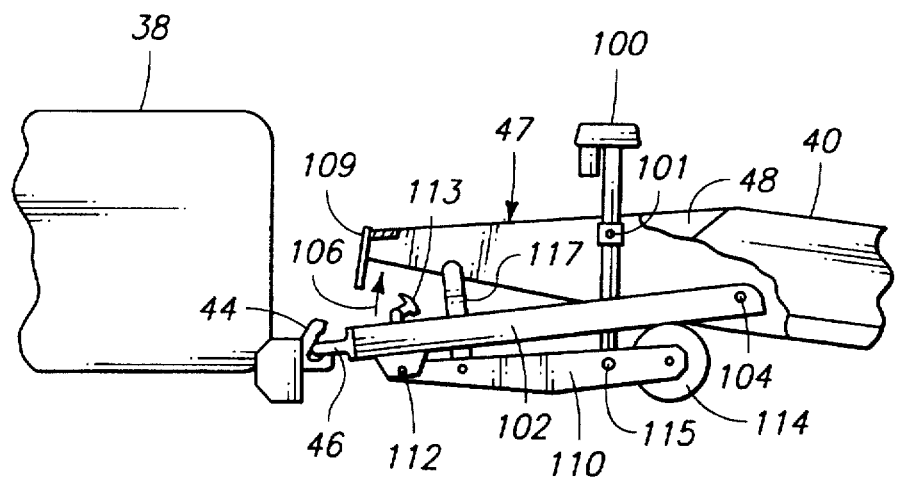
FIG. 12 shows a tongue portion of the trailer and illustrates a power jack used to tilt the trailer for loading and unloading.
Figure 13:
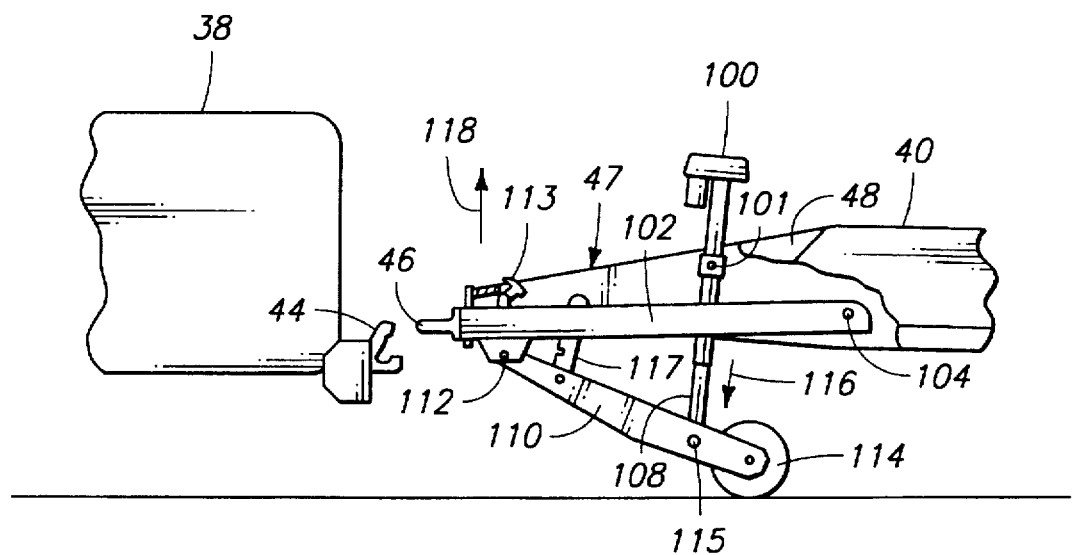
FIG. 13 is similar to FIG. 12 and illustrates the power jack being used to elevate the tongue of the trailer for hitching to a tow vehicle.

FIGS. 12 and 13 illustrate power jack 100 in more detail. One function of jack 100 is to tilt the receiving platform 48 between the inclined and travel positions. As shown in FIGS. 12 and 13, power jack is a controllably extendible and retractable member. Power jack 100 is connected to frame 40 at an upper jack pivot 101. A hitch beam 102 is pivotally connected to frame 40 at hitch beam pivot 104. A ground engagement arm 110 is pivotally connected at a proximate end thereof to hitch beam 102 at a ground arm pivot 112. The lower end of power jack 100 is pivotally connected to the ground engagement arm 110 at a lower jack pivot 115. The distal end of arm 110 rotatably mounts a tongue wheel 11.4 which engages the ground when arm 110 is extended.

The hitch and platform tilting assembly further preferably includes a hitch beam latch. The hitch beam latch includes hitch beam catch 113 which is pivotally connected to the hitch beam near its forward end. Catch 113 is manually controllable to latch or release the hitch beam relative to the adjacent portions of tongue 47.

The hitch and platform tilting assembly further includes a ground arm latch 117. Latch 117 is pivotable and manually controllable to latch or release the ground engagement arm 110 relative to the hitch beam 102. Latch 117 is latched when the platform is being tilted upwardly into the loading position, and the hitch remains connected between the truck and trailer. This construction allows the containers to be loaded and unloaded with the trailer hitched.

Power jack 100 is mounted and configured to extend and retract hitch beam 102 from trailer platform 48 about pivot point 104. This is done by first locking latch 117 and extending jack 100 to force the hitch beam downwardly against the hitch pin 44. The tongue is moved upwardly to tilt the platform 48 into the tilted position, as illustrated in FIG. 12. The platform tilts about the wheels to thereby lower the rear loading end (FIG. 9). The jack is contracted to return the platform to the travel position.

The hitch and platform tilting assembly also can be used to raise the hitch eye 46 from hitch pin on the towing vehicle. This is used to connect and disconnect the trailer 36 from tow vehicle 38. In this mode of operation, the ground arm latch 117 is released so that the ground engagement arm 110 can be extended relative to the hitch beam 102. Arm 110 is extended by elongation of jack 100. The forward end of hitch beam 102 bears upon a hitch beam receptacle formed in hitch beam receptacle piece 109 which is connected at the forward end of tongue 47. The wheel 114 engages the ground driven by extension of jack 100 to thereby raise eye 46 from the hitch pin.

FIGS. 14 and 15 depict a multipurpose trailer 120 according to this invention wherein the hitch system used is a fifth-wheel trailer hitch 121. Trailer 120 is illustrated as being towed behind a flatbed tractor truck 122 with a fifth-wheel mount 123 provided on the flatbed. In this embodiment, the powered platform tilting assembly comprises a shiftable axle shuttle 124 which moves the trailer axles and wheels from end to end of the trailer. As the axle shuttle is shifted forward toward the front end (FIG. 14), platform 125 is tilted to the inclined loading position. Axle shuttle 124 is then shifted back toward the rear end (FIG. 15) to return the platform to the travel position.

Refuse Container

FIGS. 16–19 show a preferred embodiment of a refuse container 32. Container 32 comprises two elongated, parallel spaced side walls 130 and 132, a front end wall 134, and a rear end wall 136. Rear end wall 136 is primarily in the form of a hinged door and associated door frame 139. The side and front end walls are preferably ribbed panels formed of strong, durable material such as aluminum, fiber glass, composites, plastics, steel, or wood. A floor structure 138 is provided at the base of the walls. The walls and floor structure in part define an interior cavity 140 for receiving and holding solid waste. Catch member 88 having cross pin 86 is mounted on nose section 141 of refuse container 32.

A pair of elongated side beams or rails 142 and 144 are disposed on opposing sides of the container beneath respective side walls 130 and 132. Side rails 142 and 144 function as the primary structural frame pieces of container 32. The side rails can function as skids upon which the container is slid over the ground. More preferably, the side rails have rollers 147, 149, 151 and 153 which roll the container when supported upon planar surfaces. The combined side rails and skids preferably have angled front ends 146 and 148, respectively, which are sloped to reduce snagging as the container is skidded or loaded onto the trailer. Front roller wheels 147 and 149 are mounted adjacent to the angled ends to promote easy loading. Side rails 142 and 144 also advantageously have respective rounded back ends 150 and 152, with roller wheels 151 and 153 mounted adjacent thereto.

As shown, refuse container 32 is fitted with a preferred roof structure 154. The roof structure is provided with a retractable panel or panels, preferably in the form of canopy 158 which is maneuverable between retracted and covering positions. When the roof is retracted, two sizable upward and outwardly facing top openings are provided in the container to permit users to deposit refuse into the container. Conversely, the roof panel covers refuse held in the container when placed in its covering position.

In its preferred form, the roof structure comprises a gable end panel 281 at the forward end. Front gable panel 281 is mounted above and substantially aligned with the front wall of container 32. The door frame 139 is mounted at the rear wall of container 32. Door frame 139 is shaped complementary to the front wall. A ridge member 284 extends longitudinally between the peaks of the front and rear walls. An intermediate support frame piece 156 is connected to the side walls and has a shape similar to the gambrel outline of the gable panel. Support frame piece 156 is also connected to the ridge member 284.

The end panels, ridge member and intermediate frame piece provide an arrangement of supporting surfaces over which the retractable, flexible roof canopy 158 is positioned and held. Canopy 158 is preferably formed of canvas, plastic, or nylon and has retraction operators 165 (FIG. 18). The roof retraction operators 165 include roll spindles 160 which are elongated tubular members upon which the canopy 158 is rolled. Spindles 160 roll the canopy between an outboard covering position (see FIG. 18 left side) and an inboard retracted position (see FIG. 18 right side). The right spindle is shown retracted only in that figure for illustrating the operation of the roof.

The front ends of spindles 160 are connected by universal joints 166 to crank handles 162. Crank handles 162 are held in position by canopy handle mounts 167 when not being operated to extend or retract canopy 158. Hand cranks 162 or other powered retracting drive means (not shown) are provided to operate spindle units 160 for controllably retracting and replacing the roof canopy. In other embodiments, the retractable roof can be constructed as foldable panels of aluminum, fiberglass, or steel, such as shown, in U.S. Pat. No. 4,249,852 to Alstad which is incorporated by reference.

Figure 20:
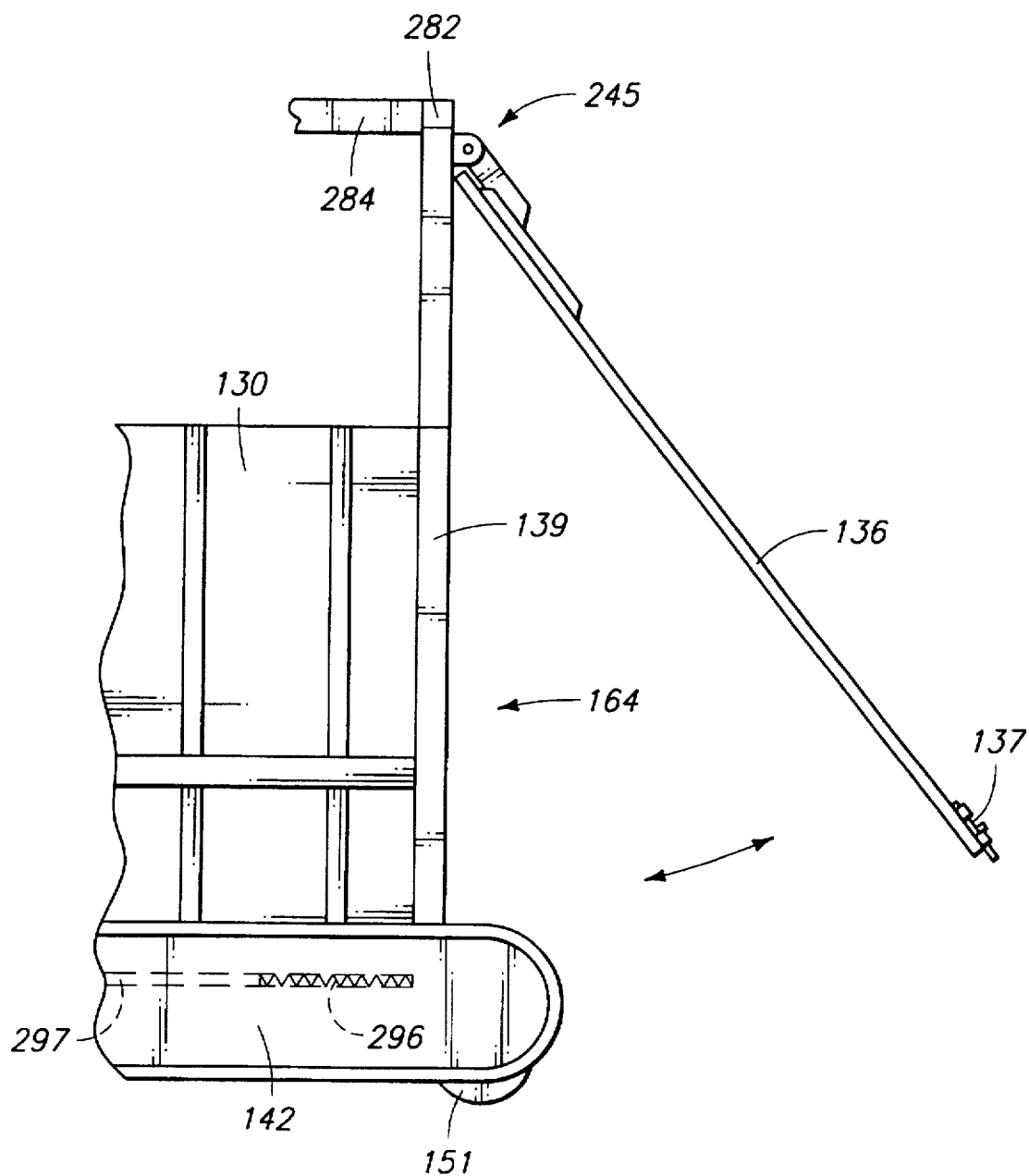
FIG. 20 is a partial side view near the rear end of the refuse container showing a hinged rear door of this invention.

As shown in FIGS. 19 and 20, rear door 136 is hinged at its upper edge upon door frame 139 using hinges 245. Door 136 swings between a closed position and open positions wherein the bottom of the door swings outward and upward. When closed, the rear door forms the fourth wall of the container. The hinges 245 can include biasing springs (not shown) which urge the door open.

Door 136 is kept closed by rotating the floor conveyor cross members 188 (described below) back toward the front and against the lower edge of the closed door to force the door against one or more spring loaded door tensioners 296. The door tensioners also preferably include an indicator rod 297 on the driver's side which contacts the inside surface of the door and moves forwardly. The indicator rod extends along the inside of the side rail to the front so that the human operator has a visual indicator of how far the rear door has been closed inwardly. This allows proper positioning of the floor cross member 188 so as to adequately close, but not over-close, the rear door. A door lock 137 is also preferably included which has a vertically slidable bolt to further secure the door when desired. The rear door remains closed while the container is being filled with trash at the remote waste collection site and while the container is in transit to the waste disposal site.

At the waste disposal site, rear door 136 is opened to form a disposal port 164 in the rear of the container to permit discharge of refuse. The refuse is conveyed or otherwise discharged out through the open discharge port in an efficient manner, such as by using the refuse discharger described below.

Refuse Discharger

FIGS. 17–19 and 21 show that refuse container 32 is equipped with a refuse discharger 170 for discharging refuse from the container at the waste disposal site. Refuse discharger 170 preferably comprises an endless or circuitously movable discharge conveyor 172 which conveys refuse from within interior cavity 140 out through disposal port 164.

In a preferred embodiment, refuse container has a stationary subfloor 174 (FIG. 21) and moveable discharging floor segments provided thereon. Subfloor 174 is connected to the side rails 142 and 144 and defines a bottom or floor of interior cavity 140. Subfloor 174 is preferably constructed of channel-shaped longitudinal floor members that run longitudinally and are bolted together with high tensile strength steel bolts.

Refuse discharging conveyor 172 includes two endless chain floor conveyor loops 176 extending longitudinally along subfloor 174 from a rear disposing end 178 of the container to a forward end 180 (FIG. 17). Discharge conveyor 172 forms a continuous loop that is movable around the stationary subfloor. Discharge conveyor loops 176 have two parallel spaced endless floor drive chains 182, 184 symmetrically arranged along opposing sides of longitudinal center axis 186. Chains 182, 184 extend between associated opposing discharge chain sprockets 200 (FIG. 22) which are rotatably mounted at the ends of the refuse container. Discharge conveyor 172 also includes chain adjustors 201 (FIG. 22) and chain guides (not shown) to facilitate smooth operation.

Stationary subfloor 174 has longitudinal channels 190 and 192 formed therein to house at least the upper travel leg of the floor drive chains 182 and 184. Subfloor channels 190 and 192 have a depth which permits the chains to ride substantially beneath the upper surface level or plane of subfloor 174. The returning lower travel legs of endless chains 182 and 184 are underneath subfloor 174. Guides (not shown) can be used along the lower legs of the floor drive chain to improve support and operation.

Multiple floor sweeping cross members 188 are attached to chain conveyor loops 176. As shown, the sweeping cross members are spaced and parallel. Sections of the upper surface of subfloor 174 are exposed between the sweeping members. Preferably, cross members 188 are formed of a hard, strong material such as steel, and are connected to both chains 182 and 184 via U-bolts 194 (FIG. 21) or other appropriate connectors. The cross members are most preferably longitudinally spaced relative to one another. Cross members 188 are arranged transverse, more preferably perpendicular, to endless chains 182 and 184. The cross members extend laterally across subfloor 174 from side to side. Cross members 188 form floor sweeps which are swept over subfloor 174 to convey refuse from forward end 180 to the rear disposing end 178 and out through rear disposal or discharge port 164.

Figure 22:
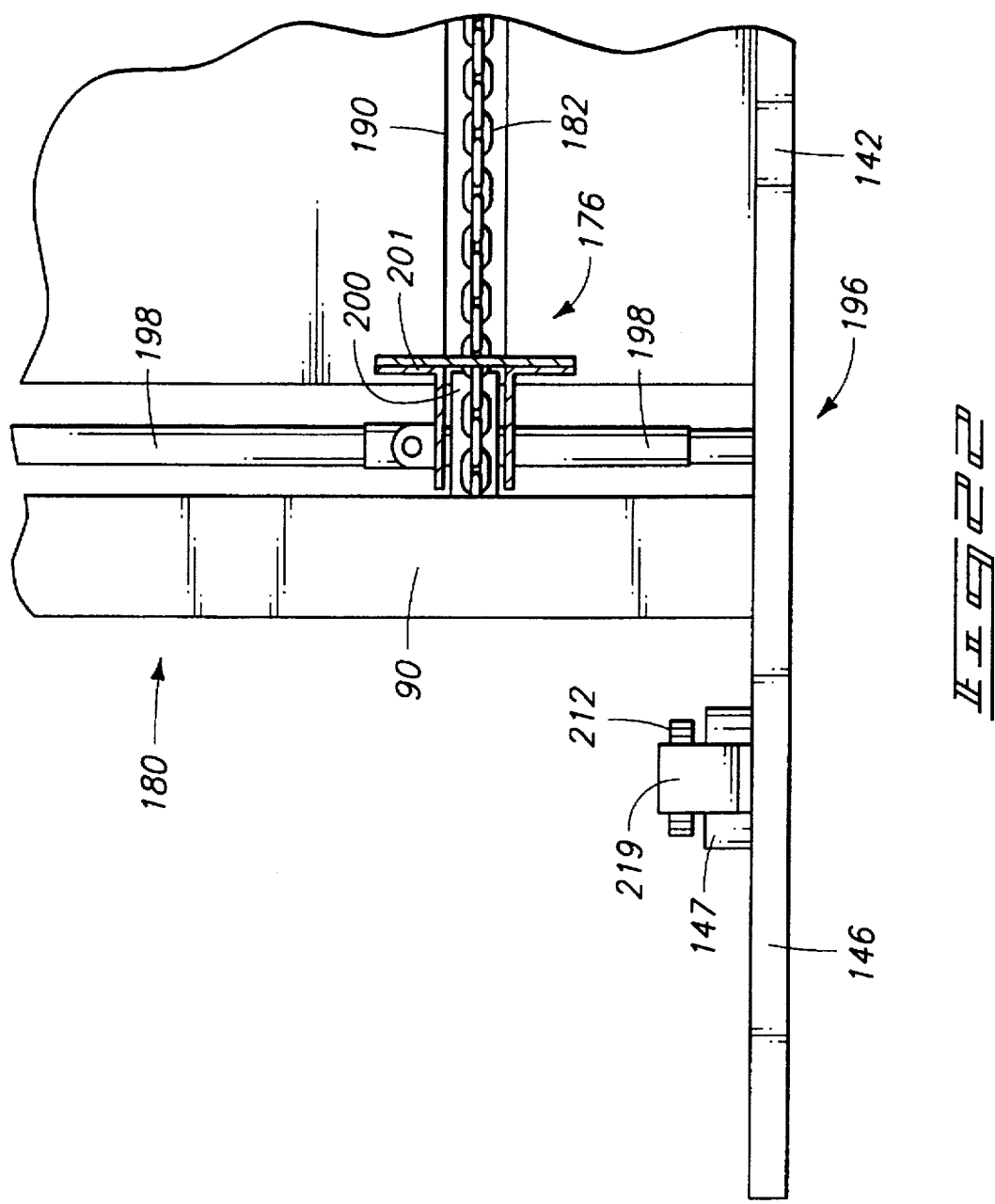
FIG. 22 is an enlarged partial view of the forward end of the refuse container showing a floor conveyor drive assembly used to drive an endless circuit floor conveyor in the refuse container.

FIGS. 22 and 23 illustrate a floor conveyor drive assembly 196 mounted at forward end 180 of refuse container 32 for rotating endless chain conveyor 176 to discharge the refuse. Floor drive assembly 196 includes a conveyor drive shaft 198 coupled to front chain sprockets 200 (only one sprocket for chain 182 is shown). Drive shaft 198 preferably has universal joints which couple sections of the drive shaft adjacent the front floor drive sprockets 200. This coupling accommodates misalignment between the sprockets so that each discharge drive chain can be properly tensioned using the adjustable chain sprocket mounting blocks 201.

Discharge conveyor drive assembly 196 also includes a parallel axes power coupling 202 (FIGS. 23 and 16) mounted upon the side rail 142 near angled end 146. Parallel axes coupling 202 includes a large sprocket 204, a small sprocket 206, chain loop 208, and an adjustable chain tensioner 210 to remove excess slack. Large sprocket 204 is connected through side rail 142 to drive shaft 198. Small sprocket 206 is connected to shaft 213 which is also connected to sprocket 212 (FIG. 24) so as to turn together. Shaft 213 extends through side rail 142. Shaft 213 also extends through and supports front roller wheel 147. Driven gear or sprocket 212 forms part of the power transfer coupling between the trailer-mounted power unit and the floor conveyor drive assembly and is described below in more detail. A mounting bracket 219 supports shaft 213 to the side rail.

Figure 21:
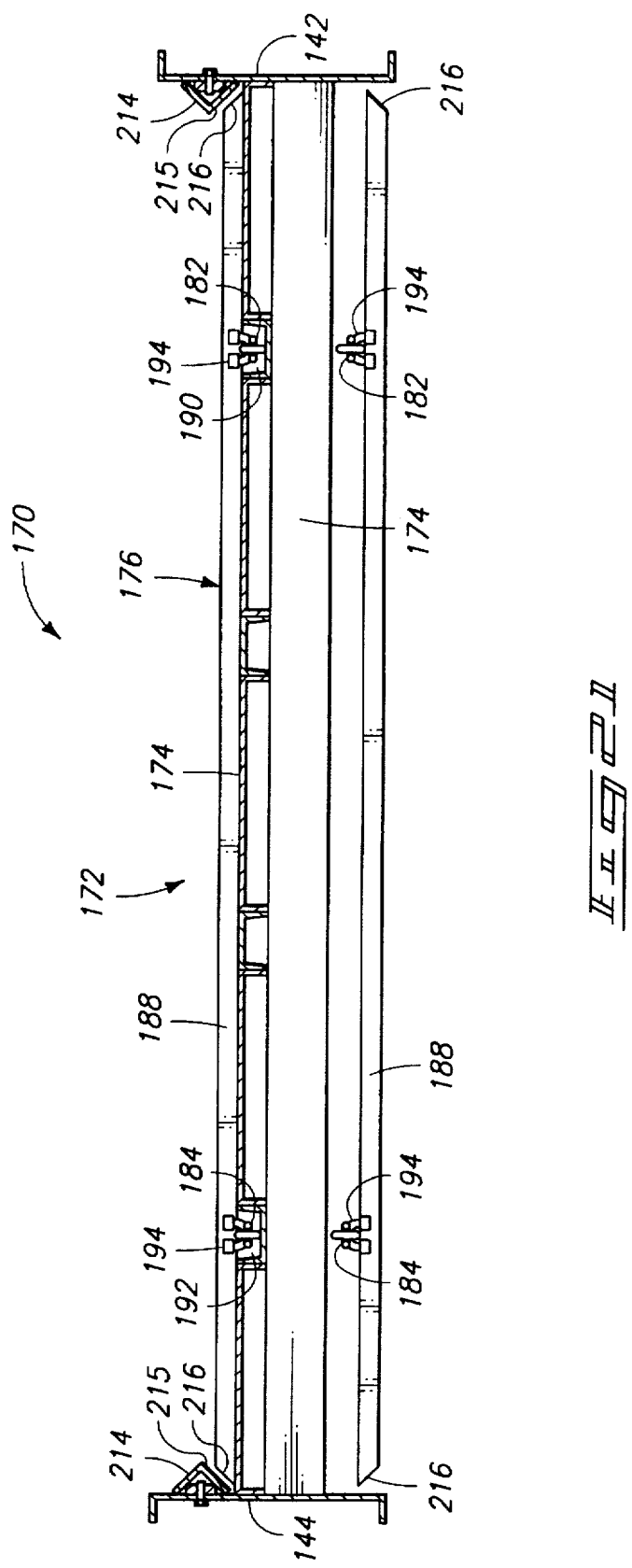
FIG. 21 is an enlarged cross-sectional view of the container floor taken through line 21—21 in FIG. 17.

Referring to FIG. 21; two deflector rails 214 are advantageously fixed to side rails 142 and 144 above beveled outer ends 216 of cross members 188. This construction serves to deflect material inwardly onto the discharge conveyor. This construction reduces the risk of jamming due to refuse being pinched between cross members 188 and the inside walls of the container. Deflector rails 214 are V-shaped and have lower surfaces 215 adjacent to and facing beveled ends 216 of cross members 188. Deflector rail surfaces 215 are angled approximately 45° relative to side rails 142 and 144. The cross member outer ends 216 are beveled at an angle of approximately 45° to complement the deflector rails 214.

Power Unit and Power Transfer Coupling

This invention, preferably includes a single prime mover 220 mounted on the trailer to supply power for both the container loading subassembly 70 and the refuse discharger 170. Mechanical power provided by the single trailer-mounted power unit is transferred to the refuse discharger via a detachable power transfer coupling.

FIG. 7 shows power unit 94 mounted to trailer frame 40. Power unit 94 comprises a prime mover in the form of motor 220 and a transmission and speed reduction module 222. Power unit 94 is connected to loading conveyor drive shaft 92 to power loading assembly 70. As examples, power unit motor 220 can be a reversible electric motor or a hydraulic orbit motor. With an electric motor, a battery source (not shown) is used for power. Such a motor and battery construction is used primary for smaller payloads. The battery can be recharged by the engine alternator on the tow vehicle during operation. The hydraulic orbit motor is used for larger load capacities and can be driven with a hydraulic pump (not shown) driven by the vehicle motor.

A power transfer coupling assembly 230 is provided between power unit 94 and refuse discharger 170. Various aspects of the power transfer coupling assembly are described with respect to FIGS. 7, 22, and 24–27. Power transfer coupling 230 comprises a trailer transfer coupling portion or subassembly and a container transfer coupling portion or subassembly. In the preferred form, the trailer coupling subassembly automatically engages with the container transfer subassembly when container 32 is fully loaded onto trailer 36. The human operator merely controls a clutch mechanism described below to either power the loading chain 78 or drive the container refuse discharger 170.

The preferred form of power transfer coupling assembly 230 includes portions of the container floor drive assembly 196 described above. More specifically, the container has a mechanical engagement piece preferably in the form of a rotatable gear or sprocket, such as the driver sprocket or gear 212. Gear 212 is mechanically coupled to shaft 213 so as to transmit a torque to small chain sprocket 206. This in turn conveys power to the container discharger as described above.

The power transfer coupling assembly also includes portions forming a subassembly on the trailer 36. As shown in FIGS. 24 and 27, the trailer transfer coupling subassembly includes a mounting bracket 270 which is connected to the trailer near the front port side of the trailer. Mounting bracket 270 supports a spring-biased floating mount 272. As shown, floating mount 272 includes a floating mount plate 274 and attached shaft brackets 276. Four floating connection bolts 277 are secured in mounting bracket 270 and extend rearwardly therefrom in a cantilevered arrangement. Floating mount biasing springs 278 are positioned to urge the floating mount plate 274 away from bracket 270 in a rearward direction. This construction provides biased accommodating engagement between sprocket 212 on the container and drive gear 234 on the trailer.

The shaft brackets 276 receive a power shaft 236 therethrough, allowing rotation of the shaft using suitable bearings or bushings 279. Drive gear 234 is mounted upon shaft 236 between the brackets 276. Drive gear 234 is not fixed to shaft 236, but is instead free to rotate thereon. Drive gear 234 is advantageously formed using two outer disks 265 and 266 which are joined by cylindrical lug pieces 267. The cylindrical lug pieces rotate into engagement with the receiving notches formed in sprocket 212 to provide mechanical engagement for power transmission.

The outward face of disk 266 also functions as a driven part of a power transmission clutch generally indicated as 280. Clutch 280 also includes a spool piece 282. Spool piece 282 is formed with a circumferential groove which receives a clutch actuation fork 285. Spool piece 282 is mounted to rotate with shaft 236 using a suitable means, such as with complementary shaft keys 286 and key ways 287. The clutch fork 285 is connected to a clutch actuation rod 291 which is moved axially to shift spool piece 282 along shaft 236 to engage or disengage complementary clutch dogs on the adjacent faces of spool piece 282 and disk 266 of drive gear 234. This allows the drive gear to be engaged and activated to turn with shaft 236 or disengaged and deactivated. When drive gear 234 is activated, the container discharge conveyor 170 is activated to convey refuse out the back end of the container.

FIGS. 7, 25, and 26 further show that the loading chain drive sprocket 82 is preferably constructed to rotate freely upon output shaft 92. A loading drive clutch assembly 97 is used to controllably engage and disengage output shaft 92 with sprocket 82. As shown, the loading drive clutch assembly is substantially the same in construction as the container floor drive clutch 280 just described above. Clutch actuation rod 291 is preferably common to both clutches so that one clutch is engaged when the other is disengaged. This construction forms a power or drive selector having two modes of operation. One mode is a loading mode wherein the loading chain is driven. This is shown in FIG. 26. The other mode is a discharge mode wherein the refuse discharger on the container is driven. This is shown in FIG. 25.

The power unit output shaft 72 is joined to shaft 236 using a universal joint 258. Shaft 236 further has a second universal joint 260. This construction allows potential misalignment to be accommodated.

The drive gear 234 and sprocket 212 form an engagement gear set 232 forming a part of power transfer coupling 230. The gear set engages when the container is resting and preferably secured in its fully installed position on the trailer. Container 32 is advantageously secured to trailer 36 in part by a container securement mechanism 238 (see FIG. 24). The securement mechanism includes an angularly displaceable latch 240 pivotally mounted on the trailer. Latch 240 clasps onto a lock pin 242 provided on side rail 142.

The gear assembly power transfer coupling is most preferred because it permits fully automatic operation of the floor conveyor refuse discharger. The power transfer coupling is automatically engaged in a standby condition once the container is properly loaded onto the trailer. Human operation is only needed if the clutch actuation rod 291 is manually controlled. Alternatively, this actuation rod can be driven by a solenoid and controlled electrically. Accordingly, the user can control both the loading operation and the refuse discharging operation from a central location, such as from the cab of the truck, or a control panel on the trailer.

Methods and Operation

The invention further includes novel methods. The methods are described in the following discussion and elsewhere herein. The preferred methods include positioning a refuse container at a desired collection site. The refuse container is used by collecting refuse at the collection site within the refuse container. The refuse container preferably has a receiving bin which receives trash, such as garbage or recyclable materials. The refuse container also preferably includes a refuse discharger which is capable of controllably discharging refuse from the receiving bin. Other features of the container have also been described herein and are additionally beneficial in defining the container and its preferred methods of operation.

The preferred methods also include traveling to the collection site with a trailer adapted to receive the refuse container thereon. The trailer is preferably constructed as described in this document.

The trailer is used with the container to perform loading of the container onto the trailer. This is preferably accomplished by tilting a receiving bed of the trailer into an inclined position. In the inclined position the receiving bed has an edge, preferably the rear edge, which is positioned low for engaging the refuse container. The loading step also preferably includes connecting a loading connector, such as loading connector 73 on the trailer, to a loading connection feature on the container, such as pin 86. This provides loading engagement between the trailer and refuse container.

The loading step also preferably includes selecting a loading mode of operation by controlling the drive selector, such as clutch actuation rod 291. This mode of operation causes power to be delivered to the container loading subsystem, preferably by propelling loading chain 78 and thereby moving the loading connector 73 and connected refuse container onto the receiving platform of the trailer. The loading step can also include guiding the container to a desired lateral position, such as by using the conical centering rollers 58. The loading step is preferably further aided by having rollers upon the container and rolling the container onto the receiving bed.

The novel methods can also advantageously include locking or securing the container on the trailer. This is advantageously done by latching a securement mechanism, such as 238, which secures the container onto the trailer. This is most preferably done by pivoting a latching piece, such as piece 240, upon a locking pin or other locking feature, such as pin 242.

The methods of this invention further include engaging a power transfer coupling, such as power transfer coupling 230. This is advantageously accomplished by bringing complementary engagement parts together during the loading of the container onto the trailer. As shown, the methods include engaging a complementary gear set, more specifically engaging a drive gear and driven gear, such as gears 234 and 212, respectively. The preferred gear set automatically engages the trailer and container portions of the power transfer coupling when loading the container onto the trailer.

The preferred methods also include relocating the refuse container to a refuse disposal site. This is done by pulling the trailer using a towing vehicle. The trailer and refuse container carried thereon are most preferably relocated in a manner that includes positioning and orienting the discharge opening into a dumping position and dumping orientation that allows refuse to be directed into a desired landfill pile, incinerator chute or other dumping location.

The methods further include powering the refuse discharger which forms a part of the container. This is advantageously accomplished by selecting a discharge mode of operation by controlling the drive selector. In the discharge mode the power system on the trailer is mechanically engaged, such as by engaging clutch 280 and thereby transferring power via power transfer coupling 230 from the trailer to the container.

Prior to discharging refuse, the methods also preferably include unlocking and opening the discharge opening door 136. The unlocking can include both unlocking the door securement 137 and moving a movable floor bar 188 from a holding position wherein the floor bar is held against lower portions of door 136.

The methods further include discharging refuse from the container. This is done with the container on the trailer. The discharging is performed by a refuse discharger which preferably operates by moving a plurality of moving floor elements, such as moving cross bars 188. The moving floor elements are moved toward the discharge opening, preferably by moving rearwardly relative to the trailer. The moving of the floor elements results in discharging refuse from the container at the disposal site.

The discharging step can further be assisted by tilting the receiving platform of the trailer with the container locked thereon. If used, the tilting step is preferably performed prior to discharging to place the container into an inclined discharging position adjacent the dumping location. The container discharger is then powered and to perform the discharging operation while the container is inclined so as to more easily discharge the refuse contents of the container. Alternatively, the container need not be inclined during the discharging operation.

The methods further preferably include relocating the container to a remote collection site for collecting another batch of refuse. The relocating step advantageously includes moving the container while still held upon the trailer. The container is thus moved by trailering the container to the desired remote collection site. At the remote collection site the trailer is positioned adjacent a desired container resting place.

The container is preferably operated to perform a latching or securing to secure tile discharge opening door in a closed position. This is preferably done by moving the refuse discharger is a reverse direction and bringing a movable cress bar 188 into engagement with lower portions of the door. The door can additionally be secured via latch 137.

The methods can also include tilting the bed of the trailer into an inclined position in preparation for unloading the trailer. The trailer loading subsystem is then operated by controlling tile drive selector into the loading mode (loading-unloading mode) and further controlling to cause the power system to move in a reverse or unloading direction. This results in propelling the loading chain 78 rearwardly which causes the container to move rearwardly, preferably by rolling the container rearwardly and otherwise partially or fully off of the tilting bed. In many circumstances, it is necessary to further effect unloading by driving the trailer forwardly and out from under the frontal portions of the container after the container has been partially rolled off of the tilted bed of the trailer.

The container is thereafter advantageously used by opening the container, such as by retracting the adjustable coverings 154. This can be done by rolling the coverings onto rolls spindles 160. Trash can then be easily deposited over the edges of the side walls.

The solid waste handling system of this invention is advantageous over conventional systems. First, the system is relatively inexpensive. The containers are designed with a unique unpowered movable floor which does not have its own power unit; yet, when installed on the trailer, the movable floor can efficiently empty the refuse without the aid of special large dumping machinery. Second, the system utilizes a trailer that can be pulled behind a standard ¾-ton pickup truck (which is very common in rural areas) and is suitable for other tasks in addition to hauling the refuse containers.

In compliance with the statute, the invention has been described in language necessarily limited in its ability to properly convey the conceptual nature of the invention. Because of this inherent limitation of language, it must be understood that the invention is not necessarily limited to the specific features described, since the means herein disclosed comprise merely preferred forms of putting the invention into effect. The invention is, therefore, claimed in any of its forms or modifications within the proper scope of the appended claims appropriately interpreted in accordance with the doctrine of equivalents.

We claim:

1. A solid waste handling system comprising:
   a tilting bed trailer; said trailer having wheels and being constructed for towing behind a truck or other wheeled tow vehicle, said trailer having a receiving platform which tilts between a travel position and an inclined loading position;
   a refuse container for receiving and holding solid waste at a remote waste collection site, the refuse container being dimensioned to be received upon the receiving platform of the trailer so that said refuse container can be loaded upon and transported by said trailer to a waste disposal site;
   a loading subassembly attached to the trailer for loading the refuse container onto the trailer into an installed position upon the trailer;
   a refuse discharger forming a part of the refuse container for discharging the refuse from the refuse container at the waste disposal site;
   motor mounted upon the trailer which powers the loading subassembly and refuse discharger;
   a mode selector connected to the motor for controllably directing mechanical torque developed by the motor to the loading subassembly or to the refuse discharger as desired;
   a detachable power transfer coupling for coupling between the trailer and the refuse container when the refuse container is installed upon the trailer; said power transfer coupling serving to transfer power developed by the motor to the refuse discharger;
   whereby the motor on the trailer serves dual functions of powering the loading subassembly and the refuse discharger as controlled by an operator.

2. A solid waste handling system according to claim 1 wherein said mode selector includes a loading drive clutch and a container refuse discharge drive clutch.

3. A solid waste handling system according to claim 1 wherein said trailer has lateral positioning rollers rotatably mounted to a loading end of the receiving platform; said rollers facilitating loading of the refuse container onto the trailer and laterally guiding the refuse container relative to the receiving platform.

4. A solid waste handling system according to claim 1 further comprising a jack mounted on the trailer to tilt the receiving platform between the travel position and the inclined loading position.

5. A solid waste handling system according to claim 1 further comprising a jack mounted on the trailer to selectively (1) elevate a tongue of the trailer for hitching to the tow vehicle and (2) tilt the receiving platform between the travel position and the inclined loading position.

6. A solid waste handling system according to claim 1 wherein said refuse container has a rear door mounted thereon to move between closed and open positions to permit the refuse to be discharged from the refuse container by the refuse discharger when the rear door is in an open position.

7. A solid waste handling system according to claim 1 wherein said refuse container has a retractable roof which maneuvers between retracted and covering positions so that the refuse can be deposited in the refuse container when the roof is in a retracted position.

8. A solid waste handling system according to claim 1 wherein said loading subassembly comprises:
   a latch detachably connectable to a nose section of the refuse container; and
   a container hoisting drive connected to receive power from said motor to propel the latch from a rear loading end of the receiving platform where the latch engages the refuse container to a front end of the receiving platform to pull the refuse container onto the receiving platform.

9. A solid waste handling system according to claim 1 wherein said loading subassembly comprises:

an endless chain loading conveyor extending from a rear loading end of the receiving platform to a front end of the receiving platform;

a hook mounted to the loading conveyor to detachably fasten onto a nose section of the refuse container; and a loading conveyor drive interconnecting the motor and the loading conveyor for moving the loading conveyor under power so that the hook can be moved from the rear loading end of the receiving platform where the hook fastens onto the refuse container to the front end of the receiving platform to pull the refuse container onto the receiving platform.

10. A solid waste handling system according to claim 1 wherein said refuse discharger comprises a movable floor which conveys refuse from within the refuse container out through an open disposal port in the refuse container.

11. A solid waste handling system according to claim 1 wherein said refuse discharger comprises:

an endless movable floor which conveys refuse from within the refuse container out through an open disposal port in the refuse container; and a floor drive connected between the endless movable floor and the power transfer coupling to move the endless movable floor under power from said motor.

12. A solid waste handling system according to claim 1 wherein said refuse discharger comprises:

an endless chain floor conveyor extending longitudinally from a rear disposing end of the refuse container to a front end of the refuse container;

multiple cross members transversely attached to said floor conveyor and extending laterally across a stationary subfloor of the refuse container; and a floor conveyor drive interconnecting the power transfer coupling and said floor conveyor for rotating said floor conveyor under power from the motor to sweep said cross members over the stationary subfloor and thereby convey refuse from within the refuse container out through an open disposal port at the rear disposing end of the refuse container.

13. A solid waste handling system according to claim 1 wherein said power transfer coupling comprises complementary engagement parts on the trailer and refuse container which automatically engage when the refuse container is properly installed upon the trailer.

14. A solid waste handling system according to claim 1 wherein said power transfer coupling comprises an engagement gear set.

15. A solid waste handling system according to claim 1 wherein said power transfer coupling comprises:

a gear set having first and second complementary gears; the first complementary gear being mounted to the trailer and operatively connected to the motor; the second complementary gear being mounted to the refuse container and operatively connected to the refuse discharger; the second complementary gear mating with and being driven by the first complementary gear when the refuse container is secured in the installed position on the trailer to power the refuse discharger.

16. A solid waste handling system according to claim 1 wherein said mode selector is a complementary clutch set which includes a loading drive clutch and a refuse container discharge drive clutch which are controlled by a common clutch actuator which engages one clutch and simultaneously disengages the other clutch.

17. A portable trailer for use in a solid waste handling system for supporting and transporting a refuse container movable between a remote waste collection site and a waste disposal site, comprising:

a frame;

multiple wheels rotatably connected to the frame so that the trailer can be towed behind a truck or other wheeled tow vehicle;

a tiltable receiving platform forming a part of the frame to tilt between a travel position and an inclined loading position;

a loading subassembly attached to the tilting platform for loading a refuse container onto the receiving platform when the receiving platform is in its inclined position;

a motor mounted upon the trailer to drive the loading subassembly when loading the refuse container onto the receiving platform;

a trailer portion of a power transfer coupling; said trailer portion of a power transfer coupling being connected to receive power from said motor;

a mode selector connected to the motor for controllably directing mechanical torque developed by the motor to the loading subassembly or to the trailer portion of the power transfer coupling as desired.

18. A portable trailer for use in a solid waste handling system according to claim 17 and further comprising lateral positioning rollers rotatably mounted to the receiving platform.

19. A portable trailer for use in a solid waste handling system according to claim 17 and further comprising a power jack mounted on the frame to tilt the receiving platform between the travel position and the inclined loading position.

20. A portable trailer for use in a solid waste handling system according to claim 17 and further comprising a power jack mounted on the frame to selectively (1) elevate a tongue of the trailer for hitching to the tow vehicle and (2) tilt the receiving platform between the travel position and the inclined loading position.

21. A portable trailer for use in a solid waste handling system according to claim 17 wherein said loading subassembly comprises:

a latch detachably connectable to a nose section of a refuse container; and a container hoisting drive connected to receive power from said motor to propel the latch from a rear loading end of the receiving platform where the latch engages the refuse container to a front end of the receiving platform to pull the refuse container onto the receiving platform.

22. A portable trailer for use in a solid waste handling system according to claim 17 wherein said loading subassembly comprises:

an endless chain loading conveyor extending from a rear loading end of the receiving platform to a front end of the receiving platform;

a hook mounted to the loading conveyor to detachably fasten onto a nose section of a refuse container; and a loading conveyor drive interconnecting the motor and the loading conveyor for moving the loading conveyor under power so that the hook can be moved from the rear loading end of the receiving platform where the hook fastens onto a refuse container to the front end of the receiving platform to pull a refuse container onto the receiving platform.

23. A portable trailer for use in a solid waste handling system according to claim 17 wherein said trailer portion of the power transfer coupling comprises a mechanical engagement part.

24. A portable trailer for use in a solid waste handling system according to claim 17 wherein said trailer portion of the power transfer coupling comprises a portion of a gear set.

* * * * *